(12) United States Patent
Fisher

(10) Patent No.: US 9,604,655 B2
(45) Date of Patent: Mar. 28, 2017

(54) METHOD AND SYSTEMS FOR STORING FUEL FOR REDUCED USAGE

(71) Applicant: General Electric Company, Schenectady, NY (US)

(72) Inventor: Kevin Michael Fisher, Northeast, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/591,689

(22) Filed: Jan. 7, 2015

(65) Prior Publication Data

US 2015/0120166 A1 Apr. 30, 2015

Related U.S. Application Data

(63) Continuation-in-part of application No. 13/974,316, filed on Aug. 23, 2013, now Pat. No. 8,958,972, and a continuation-in-part of application No. 13/973,002, filed on Aug. 22, 2013, now Pat. No. 9,103,707.

(51) Int. Cl.
| | |
|---|---|
| *F02C 3/22* | (2006.01) |
| *F17C 9/02* | (2006.01) |
| *F02B 73/00* | (2006.01) |
| *B61C 17/12* | (2006.01) |
| *B61C 17/02* | (2006.01) |

(52) U.S. Cl.
CPC .............. *B61C 17/12* (2013.01); *B61C 17/02* (2013.01); *Y02T 30/10* (2013.01)

(58) Field of Classification Search
None
See application file for complete search history.

(56) References Cited

U.S. PATENT DOCUMENTS

| | | | | |
|---|---|---|---|---|
| 4,550,701 | A * | 11/1985 | Suzuki | ................... F02D 41/04 |
| | | | | 123/436 |
| 5,588,416 | A * | 12/1996 | Suzuki | ............... F02D 35/0061 |
| | | | | 123/684 |
| 5,678,402 | A * | 10/1997 | Kitagawa | ................ F01N 9/005 |
| | | | | 60/276 |
| 6,564,172 | B1 | 5/2003 | Till | |
| 7,168,411 | B2 * | 1/2007 | Bourn | ................... F02D 31/007 |
| | | | | 123/396 |
| 7,974,774 | B2 | 7/2011 | Kumar | |
| 2005/0068184 | A1 | 3/2005 | Kane | |

(Continued)

FOREIGN PATENT DOCUMENTS

| | | |
|---|---|---|
| JP | 06249072 | 9/1994 |
| WO | WO2013091109 A1 | 6/2013 |

*Primary Examiner* — John R Olszewski
*Assistant Examiner* — Navid Ziaeianmehdizadeh
(74) *Attorney, Agent, or Firm* — John A. Kramer; Global Patent Operation

(57) ABSTRACT

Various methods and systems are provided for initiating and executing a fuel routine for reducing a pressure of gaseous fuel in a gaseous fuel system for a vehicle. In one embodiment, a control system for a vehicle comprises a controller operable to: determine a required pressure relief event is needed for a fuel tank on a fuel tender coupled to a first vehicle; and communicate a request to reduce a pressure of a gaseous component disposed within the fuel tank or adjust operation of a first engine on board the first vehicle to consume the gaseous component.

11 Claims, 8 Drawing Sheets

(56) References Cited

U.S. PATENT DOCUMENTS

| | | | |
|---|---|---|---|
| 2006/0054145 A1* | 3/2006 | Hayashi | F02M 21/06 123/527 |
| 2007/0137514 A1 | 6/2007 | Kumar | |
| 2008/0027639 A1* | 1/2008 | Tryon | B60K 6/46 701/533 |
| 2008/0190117 A1* | 8/2008 | Lee | F17C 3/00 62/47.1 |
| 2008/0202376 A1* | 8/2008 | Meltser | B61C 5/02 105/26.05 |
| 2008/0226463 A1* | 9/2008 | Batenburg | F02M 21/06 417/32 |
| 2009/0056686 A1* | 3/2009 | Suzuki | F02D 41/008 123/703 |
| 2009/0186325 A1* | 7/2009 | Kumar | B61C 17/12 434/219 |
| 2011/0253113 A1* | 10/2011 | Roth | F02D 41/008 123/568.12 |
| 2011/0257869 A1* | 10/2011 | Kumar | B61L 3/006 701/103 |
| 2011/0314839 A1* | 12/2011 | Brook | F02M 21/06 62/49.1 |
| 2012/0085260 A1 | 4/2012 | Nichini et al. | |
| 2012/0090729 A1 | 4/2012 | Nichini et al. | |
| 2012/0310456 A1 | 12/2012 | Mischler | |
| 2013/0284123 A1* | 10/2013 | Foege | F17C 6/00 123/2 |
| 2013/0311066 A1 | 11/2013 | Guimares | |
| 2013/0340715 A1* | 12/2013 | Pursifull | F02D 19/0605 123/464 |
| 2014/0033738 A1* | 2/2014 | Billig | F17C 7/00 62/48.1 |
| 2014/0033941 A1* | 2/2014 | Foege | B61C 5/00 105/1.4 |
| 2014/0033944 A1* | 2/2014 | Foege | B61C 5/00 105/1.4 |
| 2014/0076283 A1* | 3/2014 | Pursifull | F02M 21/0239 123/458 |
| 2014/0150753 A1* | 6/2014 | Foege | F02M 33/02 123/525 |
| 2014/0318503 A1* | 10/2014 | Kang | F02M 37/0052 123/506 |

* cited by examiner

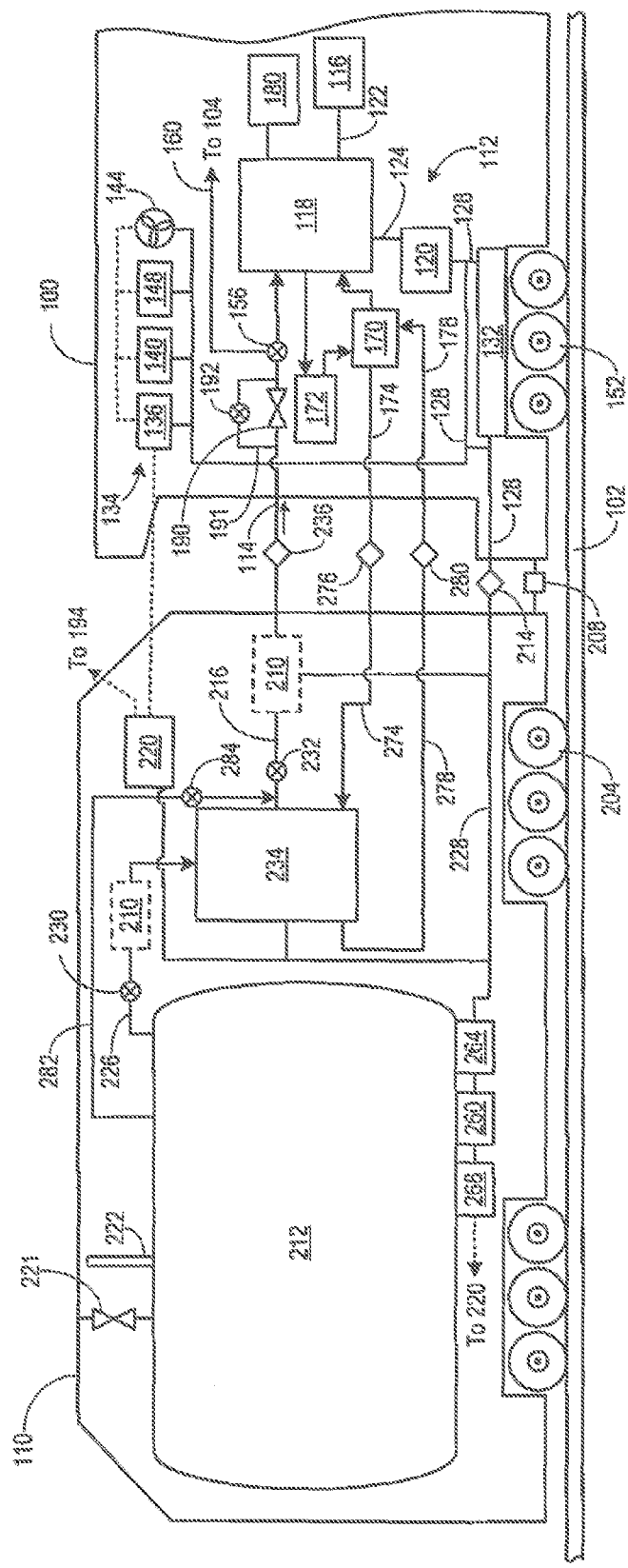

METHOD AND SYSTEMS FOR STORING FUEL FOR REDUCED USAGE

CROSS REFERENCE TO RELATED APPLICATIONS

This application is a continuation-in-part of U.S. patent application Ser. No. 13/974,316, entitled METHOD AND SYSTEMS FOR STORING FUEL FOR REDUCED USAGE, filed Aug. 23, 2013 and U.S. patent application Ser. No. 13/973,002, entitled METHOD AND SYSTEMS FOR ESTIMATING A FUEL LEVEL OF A LIQUID NATURAL GAS STORAGE CONTAINER, filed Aug. 22, 2013, each of which are hereby incorporated in their entirety herein by reference for all purposes.

FIELD

Embodiments of the subject matter disclosed herein relate to rail vehicles. Other embodiments relate to rail vehicles with fuel tenders.

BACKGROUND

Locomotives (or other vehicles) typically include a prime mover that is powered by a fuel source to generate mechanical energy. In one example of a locomotive, mechanical energy generated by the prime mover may be converted to electrical energy that is used to power traction motors and other components and systems of the locomotive. In some examples, the prime mover may be a combustion engine that is fueled by diesel, gasoline, or other liquid petroleum distillates. In other examples the engine may additionally or alternatively utilize a gaseous fuel, such as natural gas.

In light of its favorable energy content, liquefied natural gas (LNG) may be used as a fuel source for a locomotive prime mover. Particularly for long-haul applications, it may also be desirable to utilize a fuel tender for carrying one or more LNG storage tanks. The fuel tender may be coupled to the locomotive prime mover. Prior to injection into a locomotive's natural gas-fueled engine, LNG is typically vaporized into gaseous natural gas (CNG).

In one example, when LNG is stored in an unrefrigerated tank, the LNG storage tank gradually heats up due to tank insulation not being 100% efficient. Even with efficient insulation and cryogenic refrigeration equipment, heat may leak into the LNG storage tank. Additionally, over time, the LNG tank pressure builds to a safety relief pressure threshold, thereby causing a pressure relief valve to open. Opening of the pressure relief valve vents the LNG storage tank and reduces the LNG tank pressure. However, venting the LNG storage tank may waste fuel while also presenting a safety risk, including adding pollutants to the environment.

In some examples, the LNG storage tank system may include an economizer for controlling a pressure within the LNG storage tank. Specifically, when the LNG storage tank pressure increases above a threshold pressure, vapor within the LNG tank may be preferentially routed to a vaporizer in order to utilize the higher pressure gas. However, this system does not allow the LNG tank pressure to be reduced below the threshold pressure for periods of inactive use.

BRIEF DESCRIPTION

In one embodiment, a control system for a vehicle comprises a controller operable to: determine a required pressure relief event is needed for a fuel tank on a fuel tender coupled to a first vehicle; and communicate a request to reduce a pressure of a gaseous component disposed within the fuel tank or adjust operation of a first engine on board the first vehicle to consume the gaseous component.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below:

FIG. 1 shows a schematic diagram of two locomotives, a fuel tender, and a freight car according to an embodiment of the invention.

FIG. 2 shows a schematic diagram of an example fuel tender and natural gas-fueled locomotive according to an embodiment of the invention.

DETAILED DESCRIPTION

The following description relates to various embodiments of a fuel routine for reducing a pressure of gaseous fuel in a gaseous fuel system. In one example, a control system for a vehicle comprises a controller operable to: determine a required pressure relief event is needed for a fuel tank on a fuel tender coupled to a first vehicle; and communicate a request to reduce a pressure of a gaseous component disposed within the fuel tank or adjust operation of a first engine on board the first vehicle to consume the gaseous component. As one example, the fuel tank may be a liquid fuel tank containing a liquid fuel such as liquid natural gas (LNG). The gaseous component may be vapors within a vapor space of the fuel tank and/or gaseous fuel, such as compressed natural gas (CNG) in a gaseous fuel system on the fuel tender and coupled to the vehicle. The required pressure relief event may include opening of a pressure relief valve of the liquid fuel tank to vent boil-off gases (e.g., vapors) from the liquid fuel tank to atmosphere. In response to determining that the required pressure relief event is needed, the controller of the vehicle may communicate a request to reduce a pressure of the gaseous component disposed within the fuel tank and/or adjust operation of an engine on board the vehicle to consume the gaseous component.

Figure 4:
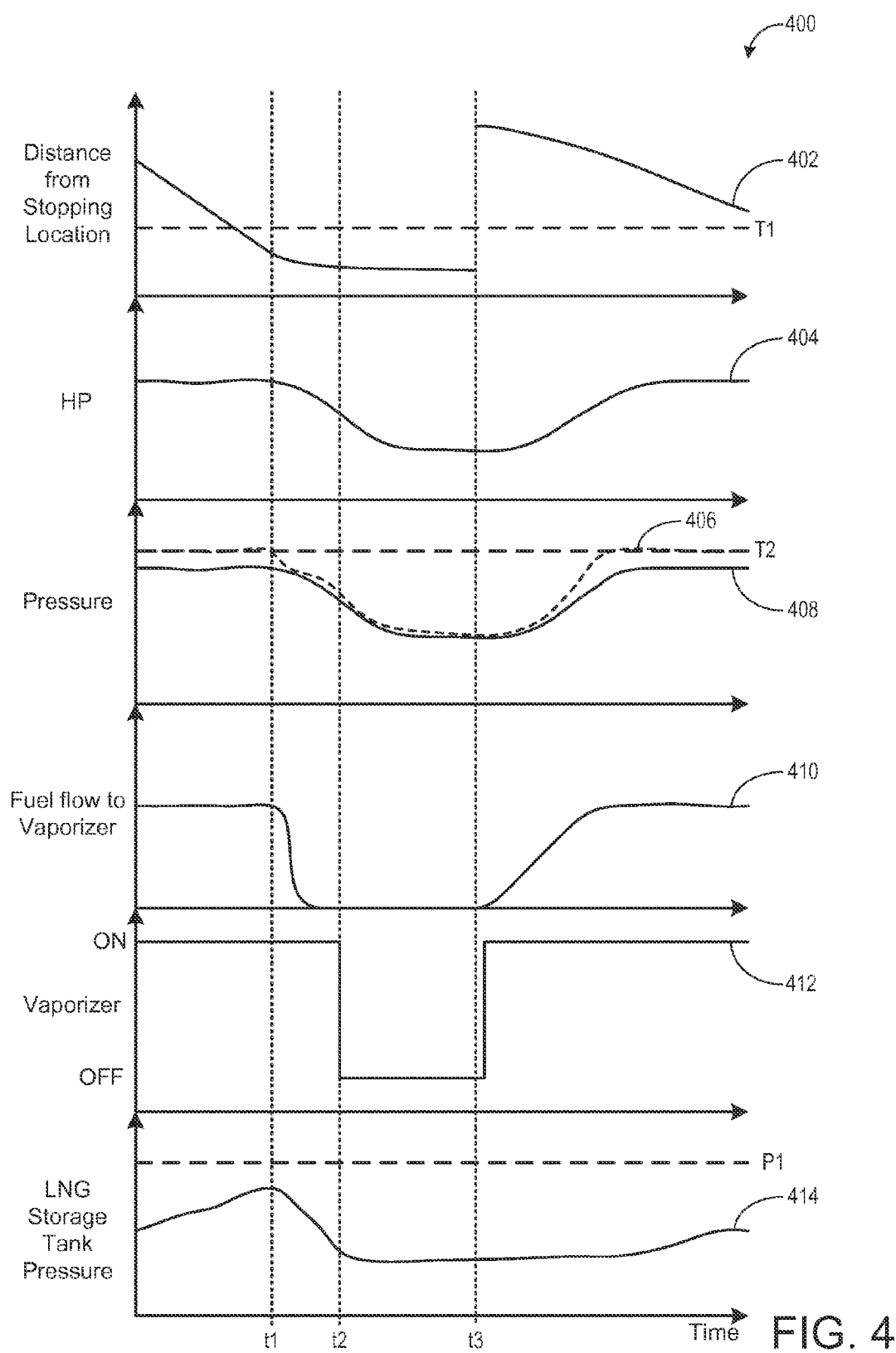
FIG. 4 shows a graphical example of a fuel routine for a gaseous fuel system according to an embodiment of the invention.
Figure 5:
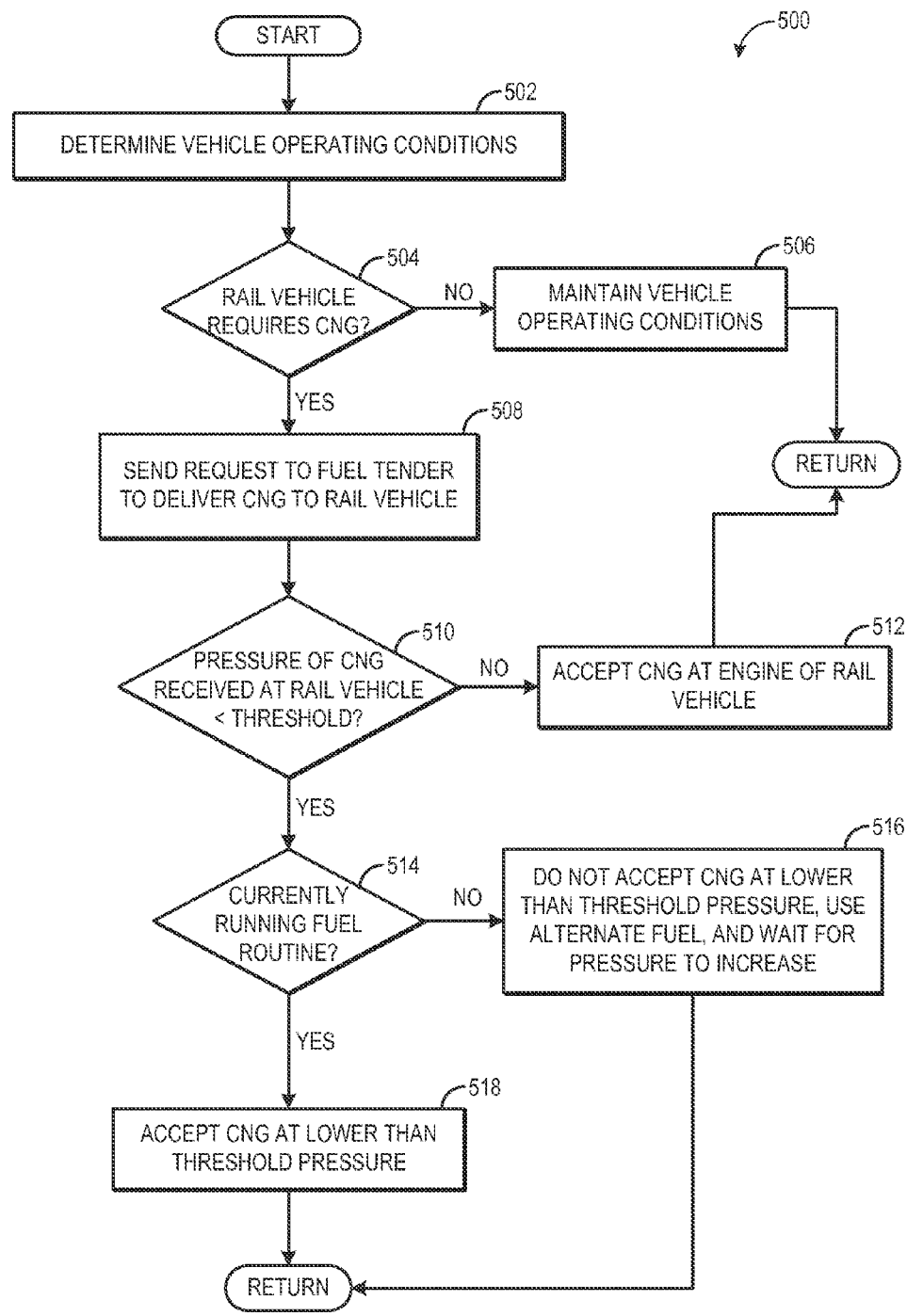
FIG. 5 shows a flow chart of a method for consuming gaseous natural gas at an engine of the rail vehicle according to an embodiment of the invention.
Figure 6:
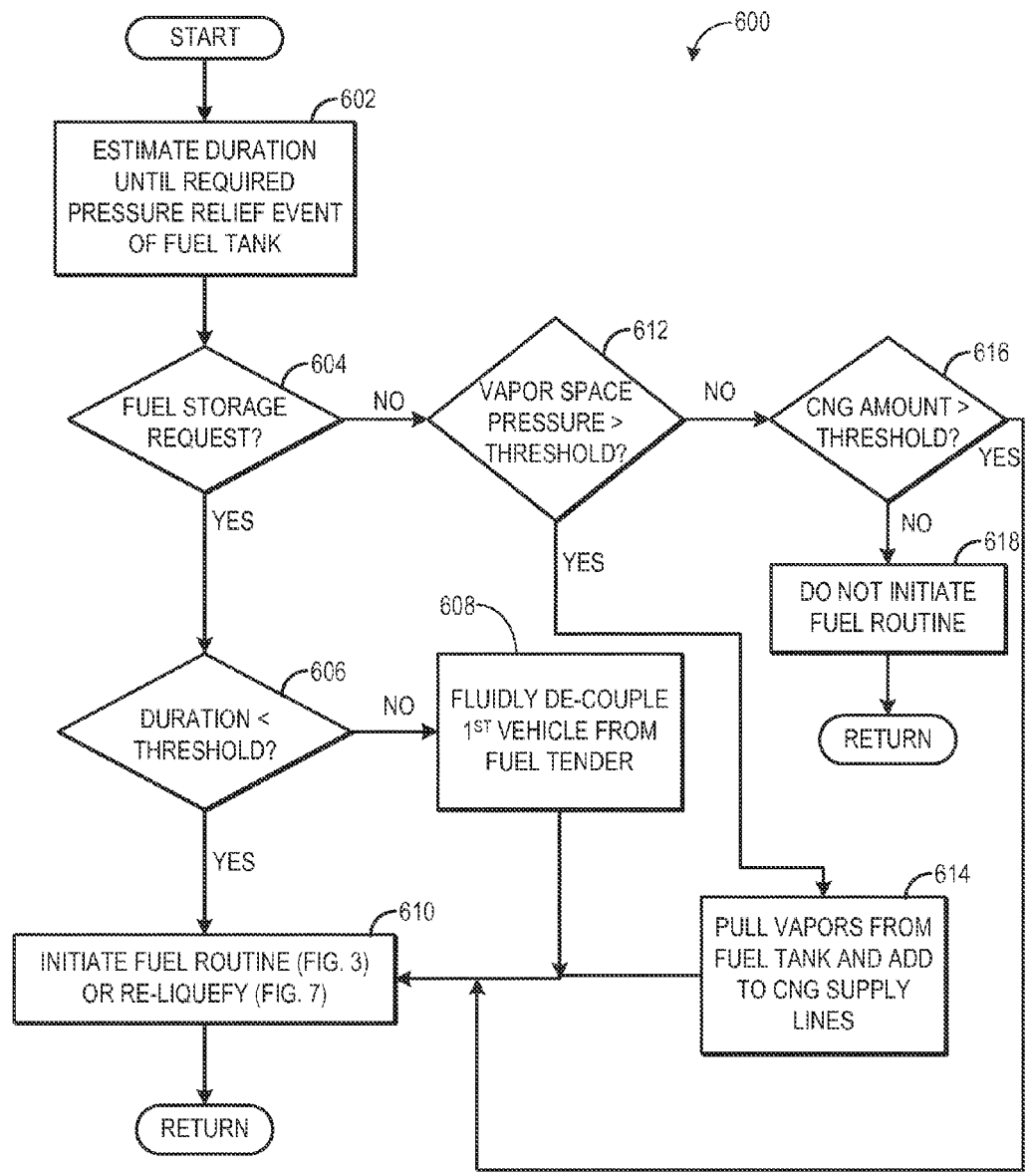
FIG. 6 shows a flow chart of a method for determining when to initiate a fuel routine for a gaseous fuel system according to an embodiment of the invention.
Figure 7:
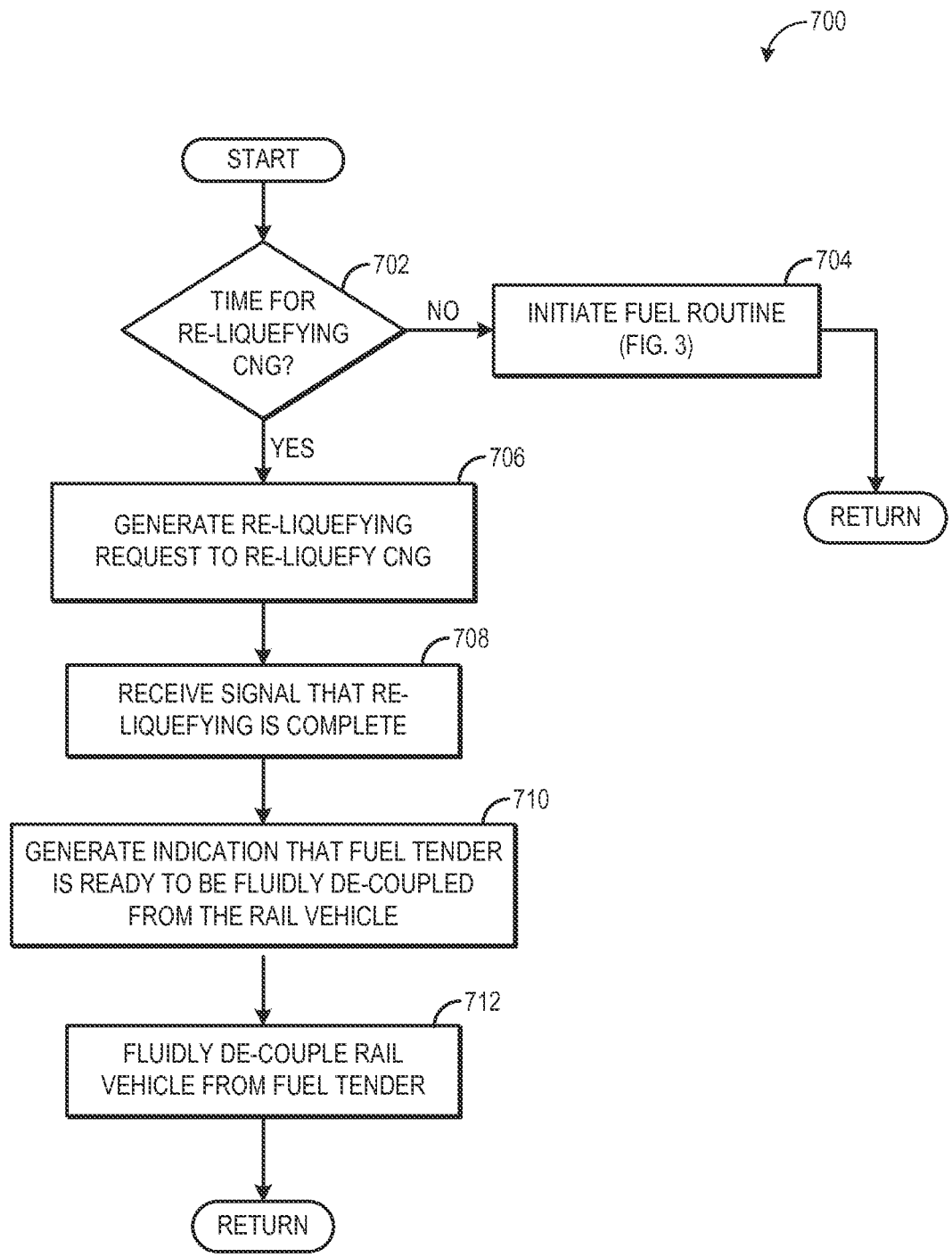
FIG. 7 shows a flow chart of a method for initiating a re-liquefaction routine for a gaseous fuel system according to an embodiment of the invention.

In one example, the vehicle may be a rail vehicle coupled to a fuel tender, such as the rail vehicle and fuel tender shown in FIGS. 1-2. Further, in this example, the fuel may be natural gas and liquid natural gas may be stored in a liquid fuel container (e.g., storage tank) on the fuel tender. A vaporizer on the fuel tender may then convert the liquid natural gas (LNG) to gaseous, compressed natural gas (CNG) and then send the CNG to the engine of the rail vehicle for consumption. A method for reducing the pressure of CNG in the natural gas fuel system (e.g., CNG in fuel supply lines and pressure in the LNG storage tank) in response to one or more vehicle operating conditions is presented at FIG. 3. FIG. 6 shows a method for determining when to initiate the fuel routine of FIG. 3. FIG. 5 shows a method for consuming the CNG at the engine of the rail vehicle based on a supply pressure of the CNG. Additionally, FIG. 4 shows example adjustments to vehicle horsepower and vaporizer operation responsive to vehicle operating conditions, the vehicle operating conditions including a distance from a stopping location of the vehicle, MAP, and a pressure of the gaseous fuel being sent to the engine. In other examples, reducing a pressure of a gaseous component in the gaseous fuel system on the fuel tender may include initiating a re-liquefying routine, as shown in FIG. 7, where gaseous fuel (e.g., CNG) is converted back into liquid fuel (e.g., LNG) and stored back within the liquid fuel tank. In some examples, an accurate fuel volume within the liquid fuel tank may be required for fuel tender and engine control. A method for storing, modifying, and updating a stored fuel volume measurement is presented at FIG. 8 while FIG. 9 shows examples of storing and modifying the stored fuel volume measurement based on fuel consumption.

In this way, the controller of the vehicle may initiate one or more fuel routines and/or adjust engine operation of the vehicle in order to reduce the vapor space pressure of the gaseous fuel system on the fuel tender in response to one or more of a fuel storage request (e.g., when the vehicle may be fluidly de-coupled from the fuel tender), a vapor space pressure of the gaseous fuel system being greater than a threshold pressure, an amount of CNG in the gaseous fuel system being greater than a threshold amount, or the like. Reducing the vapor space pressure may include one or more of sending a signal to stop vaporization of LNG to CNG, sending a signal to re-liquefy gaseous fuel, consuming a reaming amount of gaseous fuel at the engine, and/or adjusting one or more pressures or valves of the engine in order to receive CNG at a reduced supply pressure. In this way, pressure relief events may be reduced, thereby allowing a vehicle to be fluidly de-coupled from the fuel tender while also reducing the amount of pollutants released into the environment and conserving fuel.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV). For clarity of illustration, a locomotive is provided as an example of a mobile platform supporting a system incorporating an embodiment of the invention.

Before further discussion of the approach for reducing a pressure of a gaseous component on board a fuel tender, an example of a rail vehicle including one or more fuel tenders is disclosed. For example, FIG. 1 shows a schematic diagram of a consist of vehicles including a first locomotive 100, a second locomotive 104, a fuel tender 110, and a freight car 108. Specifically, FIG. 1 shows the first locomotive 100 removably coupled to the second locomotive 104 and removably coupled to the fuel tender 110 according to the present disclosure. The fuel tender 110 is shown removably coupled to a freight car 108. It will be appreciated that additional fuel tenders, freight cars, locomotives, and/or other railroad vehicles may also be removably connected to the freight car 108 and/or the second locomotive 104. It will also be appreciated that the order of the various railroad vehicles shown in FIG. 1 may be modified. For example, FIG. 1 shows the second locomotive 104 as the lead vehicle of the consist and the freight car 108 as the trail vehicle. However, in other embodiments the first locomotive 100 may be the trail vehicle.

The first locomotive 100, the second locomotive 104, the fuel tender 110, and the freight car 108 are configured to run on a rail 102 (or set of rails) via a plurality of wheels. In FIG. 1, the fuel tender 110 is positioned behind the first locomotive 100 and removably connected to the freight car 108. In other configurations, the fuel tender 110 may be positioned in front of the locomotive 100 and/or may not be connected to the freight car 108 or other rail car. In still other configurations, one or more other rail cars may be located between the fuel tender 110 and the locomotive 100.

In one example the first locomotive 100 and second locomotive 104 are powered for propulsion, while the fuel tender 110 and freight car 108 are non-powered. It will be appreciated that in other examples one or more of the fuel tender 110 and freight car 108 may also be powered for propulsion by, for example, one or more traction motors.

Additionally, FIG. 1 shows a tender controller 220 on board the fuel tender 110, a first locomotive controller 136 on board the first locomotive, and a second locomotive controller 194 on board the second locomotive. As described further below, the first locomotive controller 136 controls operation of the primary engine 118 and the tender controller 220 controls operation of the fuel tender 110. However, the first locomotive controller 136 may send signals and/or requests (e.g., commands) to the tender controller 220 regarding operation of the fuel tender 110. For example, the first locomotive controller 136 may send a request to the tender controller 220 of the fuel tender 110 to convert liquid natural gas to gaseous natural gas and send the gaseous natural gas via one or more fuel lines to an engine of the first locomotive 100, as described further below. Further, the first locomotive controller 136 may include instructions stored thereon (e.g., within a memory of the controller) for sending a plurality of requests to the tender controller 220 and to components on board the fuel tender 110. The tender controller 220 may then control actuators and/or components on board the fuel tender 110 based on the requests sent from the first locomotive controller 136 on board the first locomotive 100. As shown in FIG. 1, the tender controller 220, first locomotive controller 136, and second locomotive controller 194 all communicate electronically with one another.

Turning now to FIG. 2, the first locomotive 100 includes an engine system 112 that comprises a primary engine 118 having a plurality of cylinders. The primary engine 118 may be referred to herein as the locomotive engine. In one embodiment, each cylinder is configured to have at least one gaseous fuel injector and at least one liquid fuel injector. In the depicted example, first locomotive 100 is configured as a locomotive powered by engine system 112 that operates with various fuels, such as a first fuel and a second fuel. The fuels may include a liquid fuel, such as diesel fuel, an alternative fuel, and/or a gaseous fuel, or combinations thereof. In one example, the primary engine 118 is a dual fuel engine, such as a gas turbine, compression ignition engine, or spark ignition engine, a first fuel is gaseous natural gas that is received from the fuel tender 110 via a gaseous natural gas (CNG) fluidic coupling 114 (e.g., fuel line), and a second fuel is diesel fuel received from a diesel storage tank 116 via a fluidic coupling 122 on board the first locomotive 100. While engine system 112 is configured in one embodiment herein as a multi-fuel engine operating with diesel fuel and natural gas, in other examples engine system 112 may use various combinations of fuels other than diesel and natural gas.

The primary engine 118 is coupled to a turbocharger 180. The turbocharger 180 may be arranged between an intake passage to the primary engine 118 and an exhaust passage from the primary engine 118. The turbocharger 180 increases air charge of ambient air drawn into the intake passage in order to provide greater charge density during combustion to increase power output and/or engine-operating efficiency. The turbocharger 180 may include a compressor (not shown) which is at least partially driven by a turbine (not shown). In some examples, the compressor may include a compressor recirculation valve (CRV) operable by the locomotive controller 136 and configured to recirculate intake air around the compressor. Additionally, the turbine may include a waste gate operable by the locomotive controller and configured to divert exhaust gases around the turbine. As such, opening the CRV and/or the waste gate may reduce boost and torque output of the primary engine 118.

The primary engine 118 is configured to generate a torque that is transmitted to a power conversion unit 120 along a drive shaft 124. The power conversion unit 120 is configured to convert the torque into electrical energy that is delivered via electrical bus 128 to at least one traction motor 132 and to a variety of downstream electrical components in the first locomotive 100. Such components may include, but are not limited to, compressors 140, blowers 144, batteries 148, an electronics control system 134 comprising one or more controllers 136, shutoff valves, pressure regulators, radiators, lights, on-board monitoring systems, displays, climate controls (not shown), and the like. The electrical bus 128 further delivers electrical energy to the fuel tender 110.

Based on the nature of the generated electrical output, the electrical bus 128 may be a direct current (DC) bus (as depicted) or an alternating current (AC) bus. In one example the power conversion unit 120 includes an alternator (not shown) that is connected in series to one or more rectifiers (not shown) that convert the alternator's electrical output to DC electrical power prior to transmission along the electrical bus 128. The alternator may include, for example, a high-speed generator, a generator machine whose stator flux is synchronous to the rotor flux, or an asynchronous machine.

Based on the configuration of a downstream electrical component receiving power from the electrical bus 128, one or more inverters may be configured to invert the electrical power from the electrical bus prior to supplying electrical power to the downstream component. In one example, a single inverter may supply AC electrical power from a DC electrical bus to a plurality of components. In another non-limiting embodiment, each of a plurality of distinct inverters may supply electrical power to a distinct component.

The traction motor 132 receives electrical power from the power conversion unit 120 and is coupled to one or more axles/driving wheels 152. In this manner, the traction motor 132 is configured to drive the axles/driving wheels 152 along the rail 102. It should be appreciated that the number of sets of axles/driving wheels 152 may vary, and that one or more traction motors 132 may be provided for each set of axles/driving wheels. The traction motor 132 may be an AC motor. Accordingly, an inverter paired with the traction motor 132 may convert DC input to an appropriate AC input, such as a three-phase AC input, for subsequent use by the traction motor. In other non-limiting embodiments, traction motor 132 may be a DC motor directly employing the output of the power conversion unit 120 after rectification and transmission along the DC bus 128.

One example locomotive configuration includes one inverter/traction motor 132 pair per axle/driving wheel 152. Traction motor 132 may also be configured to act as a generator providing dynamic braking to brake the first locomotive 100. In particular, during dynamic braking, the traction motor may provide torque in a direction that is opposite from the rolling direction, thereby generating electricity that is dissipated as heat by resistors (not shown) connected to the electrical bus 128.

The first locomotive controller 136 on board the first locomotive 100 controls the primary engine 118 by sending commands to various engine control hardware components such as invertors, alternators, relays, fuel injectors, fuel pumps (not shown), or the like. As described further below, in one example, the first locomotive controller 136 also monitors locomotive operating parameters in active operation, idle, and shutdown states. Such parameters may include, but are not limited to, manifold air temperature (MAT), ambient temperature, engine oil temperature, compressor air pressure, main air reserve pressure, battery voltage, a battery state of charge, brake cylinder pressure, or the like. The first locomotive controller 136 further includes computer readable storage media (not shown) including code for enabling on-board monitoring and control of rail vehicle operation.

The first locomotive controller 136, while overseeing control and management of the primary engine 118 and other locomotive components, may be configured to receive signals from a variety of engine sensors, as further described herein. The first locomotive controller 136 may utilize such signals to determine operating parameters and operating conditions, and correspondingly adjust various engine actuators to control operation of the first locomotive 100. For example, the first locomotive controller 136 may receive signals from various engine sensors including, but not limited to, engine speed, engine load, boost pressure, exhaust pressure, ambient pressure, exhaust temperature, manifold pressure (MAP), or the like. Correspondingly, the first locomotive controller 136 may control the locomotive 100 by sending commands to various components such as traction motors, alternators, cylinder valves, throttles, or the like. As described further below, the first locomotive controller 136 at least partially controls operation of the fuel tender by sending commands (e.g., requests) to the tender controller 220 on board the fuel tender. For example, the commands sent to the tender controller 220 may include commands to initiate various fuel routines and/or commands for controlling various components on board the fuel tender such as a vaporizer 234, a pump 210, a LNG storage tank 212, or the like. In one example, the commands for controlling various components on board the fuel tender may be indirect commands based on fuel routine requests sent to the fuel tender. In some examples, the vaporizer 234 may be referred to as a regasification unit. For purposes of this description, an "on-board" component, device or other structure means that the component or device is physically located on the vehicle being described. For example, with respect to the fuel tender 110, a component or structure physically located on the fuel tender is on board the fuel tender, including when the fuel tender is coupled to a locomotive or other rail vehicle and when the fuel tender is not coupled to a locomotive or other rail vehicle.

In one example, the computer readable storage media configured in the first locomotive controller 136 may execute code to auto-stop or auto-start the primary engine 118 by enabling, for example, an Automatic Engine Start/Stop (AESS) control system routine. For example, the locomotive controller may be coupled to an AESS control system and may initiate the AESS system when the engine is turned off and not operating. For example, the AESS system may be configured to restart the engine of the first locomotive in order to consume gaseous fuel in response a vapor space pressure of the fuel tank increases above a threshold level, or another parameter indicating that a pressure relief valve of the LNG storage tank may open and vent gases to the atmosphere. As discussed in more detail below, the first locomotive controller 136 also communicates with the tender controller 220 on board the fuel tender 110 to, for example, request delivery of gaseous natural gas for the primary engine 118. As shown in FIGS. 1-2, the first locomotive controller 136 also communicates with the second locomotive controller 194 in the second locomotive 104 to, for example, coordinate pass-through delivery of gaseous natural gas from the fuel tender 110 to a natural-gas fueled engine in the second locomotive 104. The computer readable storage media configured in the first locomotive controller 136 may execute code to appropriately transmit and receive such communications.

With continued reference to FIG. 2, the fuel tender 110 is removably coupled to the first locomotive 100 and includes axles/wheels 204 configured to travel along rail 102. In the depicted example, the fuel tender 110 includes six pairs of axles/wheels 204. In another embodiment, the fuel tender 110 may include four axles and four pairs of wheels (e.g., eight wheels in total). The fuel tender 110 further includes a mechanical coupling mechanism 208 that removably couples the fuel tender to the first locomotive 100 for linked movement thereof. In other examples, the fuel tender 110 may include a second coupling mechanism (not shown) that may removably couple the fuel tender to another rail vehicle, such as the freight car 108 or to another locomotive.

The fuel tender 110 is configured to carry one or more fuel storage tanks (e.g., fuel tank). In one embodiment, as shown in FIG. 2, the fuel tender 110 includes an on-board cryogenic LNG storage tank 212 for storing LNG. The LNG storage tank 212 is a fuel container wherein the fuel stored in the fuel container is LNG. In one example, the LNG storage tank 212 may take the form of a vacuum jacketed pressure vessel that stores LNG at pressures ranging from approximately 690 kPa to approximately 900 kPa. It will be appreciated that to maintain LNG in a liquid state, the LNG may be stored at a temperature range of approximately 4-80 degrees Celsius. In some examples, as shown in FIG. 2, the fuel tender 110 includes a cryogenic unit 268 for helping maintain the LNG within desired temperature and pressure ranges. In other example, the fuel tender 110 may not include the cryogenic unit 268.

Even with efficient insulation and cryogenic refrigeration equipment, heat may leak into the LNG storage tank 212 and cause vaporization of portions of the LNG into boil-off gas. As discussed above, the LNG storage tank 212 may include a first portion filled with LNG. The remaining portion of the LNG storage tank 212 may contain a gaseous component (e.g., CNG). As such, the remaining portion of the LNG storage tank 212 not containing LNG may be referred to herein as the vapor space of the LNG storage tank. The CNG in the LNG tank vapor space may cause the pressure in the LNG storage tank to increase over time. As discussed further below, this may result in opening of a pressure relief valve 221 of the LNG storage tank.

It will also be appreciated that the LNG storage tank 212 may have various sizes and configurations and may be removable from the fuel tender 110. Further, as shown in FIG. 2, the storage tank 212 is configured to receive LNG from an external refueling station via port 222. In alternate examples, the storage tank 212 may receive LNG through another port or location on the storage tank 212.

The LNG storage tank 212 supplies LNG via cryogenic LNG fluidic coupling 226 and one or more valves 230 to a vaporizer 234. The vaporizer 234 converts the LNG into gaseous or compressed natural gas (CNG), or vaporizes the LNG, by the application of heat to the LNG. Specifically, the vaporizer 234 vaporizes the LNG to CNG by utilizing heated fluid supplied to the vaporizer 234. In some examples, the vaporizer 234 includes a pump, motor, and valve, all of which may be controlled by the locomotive controller 136 and/or the tender controller 220. As shown in FIG. 2, heated fluid for the conversion of LNG to CNG is generated by a heat exchanger 170 positioned on the first locomotive 100. The heat exchanger 170 receives engine cooling water from a radiator 172. Engine cooling water from the primary engine 118 flows to the radiator 172 to be cooled and then sent back to the primary engine 118. Before the cooled engine cooling water flows back to the primary engine 118, the cooled engine cooling water passes through the heat exchanger 170 to heat a secondary fluid, or coolant. The coolant heated at the heat exchanger 170 then flows from the heat exchanger to the vaporizer 234 on the fuel tender 110 via heated coolant line 174 and heated coolant line 274. The heated coolant line 174 and the heated coolant line 274 are coupled together at a detachable interface coupling 276 that enables the fuel tender 110 to be decoupled from the first locomotive 100. Coolant then returns to the heat exchanger 170 via coolant line 278 and coolant line 178. The coolant line 278 and the coolant line 178 are coupled together at a detachable interface coupling 280 that enables the fuel tender 110 to be decoupled from the first locomotive 100. In alternate embodiments, heat may be supplied to the vaporizer 234 from an alternative source on board the first locomotive 100, another locomotive or other rail vehicle, and/or fuel tender. Further, additional and/or alternative liquid or gas sources may be used to provide heat to the vaporizer 234.

The CNG is then delivered to the primary engine 118 of the first locomotive 100 via supply lines to power the primary engine 118. As shown in FIG. 2, the CNG is delivered to the primary engine 118 via CNG fluidic coupling 216 and CNG fluidic coupling 114 and one or more control valves 232. Thus, the CNG fluidic coupling 216 and the CNG fluidic coupling 114 may be referred to herein as the supply lines. In some examples, as shown in FIG. 2, a pass-through control valve 156 is provided to direct at least a portion of the CNG through the first locomotive 100 via a pass through fluidic coupling 160 to the second locomotive 104. In this manner, a natural gas-fueled engine in the second locomotive 104 may be powered by gaseous natural gas from the fuel tender 110. In alternate examples, there may not be a control valve 156 and CNG may only be delivered to the first locomotive 100. In yet another example, additional control valves may be positioned in the CNG fluidic coupling 114 to direct CNG to additional locomotives or rail cars.

In a first embodiment, the LNG storage tank 212 may be a higher pressure LNG storage tank wherein the LNG is maintained at a pressure greater than a threshold supply pressure. In one example, the threshold supply pressure of CNG may be approximately 827 kPa. The pressure within the LNG storage tank 212 may then be maintained above 827 kPa (e.g., 1,100 kPa) so the CNG arriving at the first locomotive 100 is at the threshold supply pressure. In other examples, the threshold supply pressure of CNG may be greater or less than 827 kPa and the LNG storage tank pressure may be maintained at a level greater than the threshold supply pressure to account for any pressure losses in the CNG supply system. In this first embodiment, LNG is metered from the storage tank 212 and to the vaporizer 234 by the valve 230, or other metering device. CNG converted from the LNG at the vaporizer 234 then flows to the first locomotive 100 via the CNG fluidic coupling 114. The flow of CNG to the first locomotive is controlled or metered via the valve 232.

In a second embodiment, the LNG storage tank 212 may be a lower pressure LNG storage tank wherein the LNG is maintained at a pressure lower than the threshold supply pressure (e.g., less than 827 kPa). In this embodiment, a pump 210 may be positioned in the LNG fluidic coupling 226 to control a flow (e.g., flow rate) of LNG to the vaporizer 234 and/or in the CNG fluidic coupling 216 to control a flow (e.g., flow rate) of CNG to the first locomotive 100.

The CNG fluidic coupling 114 further includes a detachable interface coupling 236 that enables the fuel tender 110 to be decoupled from the locomotive 100. It will also be appreciated that in other embodiments the pass-through control valve 156 may be located on board the fuel tender 110, along with suitable fluidic couplings to pass through fluidic coupling 160.

As shown in FIG. 2, components on the fuel tender 110 are powered with electrical energy from the first locomotive 100. Specifically, the electrical bus 128 is coupled to an electrical bus 228 at a detachable interface coupling 214. The detachable interface coupling 214 enables the fuel tender 110 to be decoupled from the first locomotive 100. The electrical bus 128 and the electrical bus 228 may be referred to herein as electrical energy lines. In one embodiment, the rail vehicle may include one or more electrical energy lines traversing a space between the first locomotive 100 and the fuel tender 110. In other embodiments, components on the fuel tender 110 may be powered alternatively or additionally with an auxiliary power unit and/or batteries on board the fuel tender 110. In yet other embodiments, components of the fuel tender 110 may be powered with electrical energy from an alternate or additional locomotive.

Electrical energy generated at the first locomotive 100 travels to the fuel tender 110 through the electrical bus 228. Components on board the fuel tender 110 receive electrical energy via the electrical bus 228. Such components may include, but are not limited to, the vaporizer 234, tender controller 220, control valves 230, 232, LNG tank pressure sensor 260, LNG tank temperature sensor 264, cryogenic unit 268, flow meters, ambient air temperature sensors, compressors, blowers, radiators, batteries, lights, on-board monitoring systems, displays, climate controls (not shown), and the like.

The tender controller 220 on board the fuel tender 110 controls and/or actuates various components on board the fuel tender 110, such as the vaporizer 234, cryogenic unit 268, control valves (e.g., valve 230 and valve 232), one or more pumps 210, and/or other components on board the fuel tender 110, by sending commands to such components. The commands sent by the tender controller 220 may be based on commands sent to the tender controller 220 from the first locomotive controller 136 on board the first locomotive 100. For example, the first locomotive controller 136 may send a request to the tender controller 220 to stop vaporizing LNG and thereby stopping the conversion of LNG to CNG. In response, the tender controller 220 may actuate the vaporizer 234 to turn off or stop vaporizing LNG. In some examples, the tender controller 220 may also send commands and/or requests to the locomotive controller 136. For example, as discussed further below, if a vapor space pressure (e.g., pressure in the LNG storage tank 212) is above a threshold pressure, the tender controller 220 may send a request to the locomotive controller 136 to initiate a fuel routine to reduce CNG supply pressure and subsequently the vapor space pressure.

The tender controller 220 may also monitor fuel tender operating parameters. Such parameters may include, but are not limited to, pressure and temperature of the LNG storage tank 212, a level or volume of the LNG storage tank 212, pressure and temperature of the vaporizer 234, ambient air temperature, and the like. In one example, the tender controller 220 may send a LNG storage tank 212 pressure or CNG supply pressure measured at the LNG storage tank 212 or within the CNG supply lines to the first locomotive controller 136 on board the first locomotive 100.

The LNG storage tank may also supply CNG (e.g., vapors) from the vapor space of the LNG storage tank via CNG fluidic coupling 282 and one or more valves 284 to CNG fluidic coupling 216. In this way, vapors from the LNG storage tank (e.g., liquid fuel tank) may be combined with the already compressed gaseous fuel (e.g., CNG) exiting the vaporizer. By pulling vapors from the LNG storage tank vapor space, a vapor space pressure within the LNG storage tank may be reduced, thereby increasing a duration until a required pressure relief event and reducing the likelihood that a pressure relief valve may open. In one example, the vapor space pressure within the LNG storage tank is based on a temperature and volume of liquid fuel in the fuel tank. In another example, the vapor space pressure may be measured with a pressure sensor disposed within the LNG storage tank.

The first locomotive may include a gaseous fuel supply regulator valve 190. The regulator pressure may be set to a threshold supply pressure such that only CNG over the threshold supply pressure may flow to the primary engine from the fuel tender. In one example, the first locomotive controller may adjust the set threshold supply pressure of the regulator valve to allow CNG having a pressure lower than the threshold supply pressure to flow to the primary engine. In an alternate embodiment, the fuel supply regulator valve may be disposed in the CNG fluidic coupling 216 on the fuel tender. As shown in FIG. 2, there may be one or more additional valves 192, adjustable by the first locomotive controller, to allow CNG to bypass the gaseous fuel supply regulator valve and flow to the primary engine on board the first locomotive when a supply pressure of CNG from the fuel tender is less than the threshold supply pressure. For example, the one or more additional valves may be disposed in bypass line 191 around the gaseous fuel supply regulator valve. In another embodiment, the bypass line may be disposed around additional or alternate high pressure components (e.g., such as valves, heat exchangers, flow passages of smaller diameter, or the like) to allow CNG with a lower pressure (e.g., lower than the threshold supply pressure) to reach the primary engine so that the primary engine may consume the lower pressure CNG.

In one example, the fuel tender may operate either as a tender where it is fluidly coupled to the first locomotive via the detachable interface couplings 236, 276, and 289 and CNG fluidic coupling 114 or as a tanker (e.g., storage vessel) where it is fluidly de-coupled from the first locomotive. Once a pressure of a gaseous component of the fuel tender (e.g., the CNG pressure and/or the vapor space pressure of the fuel tank) is reduced below a threshold pressure such that a duration until a required pressure relief event (where a pressure relief valve opens) is greater than a threshold duration (as set by regulatory standards), the first locomotive and fuel tender may be fluidly de-coupled from one another. In one example, fluidly de-coupling may include closing or detaching one or more of the detachable interface couplings 236, 276, and 289 such that no CNG flows from the fuel tender to the first locomotive. In another example, fluidly de-coupling the fuel tender and first locomotive may include shutting off one or more valves disposed in the fuel lines (e.g., CNG fuel lines) between the fuel tender and first locomotive.

It will be appreciated that the fuel tender 110 is not limited to the components shown in the example of FIG. 2 and described above. In other examples, the fuel tender 110 may include additional or alternative components. As an example, the fuel tender 110 may further include one or more additional sensors, flow meters, control valves, or the like.

The systems of FIGS. 1-2 provide for a system of mechanically coupled rail vehicles, comprising a rail vehicle having a multi-fuel engine, a fuel tender configured to fluidly and mechanically couple to the rail vehicle, the fuel tender including a vaporizer and a fuel container (e.g., fuel tank) containing liquid fuel (e.g., liquefied natural gas), and a controller on board the rail vehicle, the controller configured to send a request to the fuel tender to reduce converting liquid natural gas to gaseous natural gas, the request sent in response to a fuel storage request. In one example, the reducing may include gradually ramping down the conversion of liquid natural gas to gaseous natural gas until the vaporizer stops converting liquid natural gas to gaseous natural gas. The request further includes sending remaining gaseous natural gas to the multi-fuel engine of the rail vehicle for consumption. The controller is further configured to allow gaseous natural gas at a pressure lower than a threshold pressure to be consumed by the multi-fuel engine. Further, the controller is configured to decrease a manifold pressure of the multi-fuel engine of the rail vehicle in order to optimize consumption of the gaseous natural gas at the pressure lower than the threshold pressure in response to the fuel storage request.

As discussed above, LNG may be stored in a fuel container, such as the LNG storage tank 212 shown in FIG. 2. In one example, the LNG storage tank is on a fuel tender coupled to a rail vehicle. The rail vehicle includes a controller and a multi fuel engine. In one example, as shown at FIGS. 1-2, the fuel tender is the fuel tender 110, the rail vehicle is the first locomotive 100, the multi fuel engine is the primary engine 118, and the engine controller is the first locomotive controller 136. Further, as shown in FIG. 1, the rail vehicle and the fuel tender may be part of a consist including one or more additional rail vehicles and/or fuel tenders.

When LNG is stored in an unrefrigerated tank, the LNG tank gradually heats up due to the tank insulation not being 100% efficient. Even with efficient insulation and cryogenic refrigeration equipment, heat may leak into the LNG storage tank. As discussed above, the LNG tank includes a first portion filled with LNG and a remaining, second portion containing CNG. The CNG in the LNG tank vapor space may cause the pressure in the LNG tank to increase, for example if a temperature of the LNG tank increases. Over time the LNG tank pressure builds to a safety relief pressure threshold, thereby causing a pressure relief valve of the LNG tank to open (e.g., pressure relief valve 221 shown in FIG. 1). Opening of the pressure relief valve vents the LNG tank and reduces the LNG tank pressure. However, venting the LNG tank may waste fuel while also presenting a safety risk, including adding pollutants to the environment. Further, each opening of the safety relief valve may cause the relief valve to open at a slightly lower pressure due to mechanical features of the valve at each subsequent opening.

The fuel tender may be used in a tender mode where gaseous fuel is supplied to an engine of the rail vehicle or a tanker (e.g., storage) mode where gaseous fuel is not supplied to the engine and the fuel tender is fluidly de-coupled from the rail vehicle. While the rail vehicle and fuel tender may still be physically coupled to one another, at least no fuel may flow between the fuel tender and the rail vehicle. When in the tanker mode, there may be regulations on how long the liquid fuel tank (e.g., LNG storage tank) must go without venting vapor space gases to the atmosphere (e.g., 21 days without venting gases via a pressure relief valve). Thus, when the fuel tender is being transitioned into a tanker mode, the pressure of gaseous fuel in the gaseous fuel system of the fuel tender must be reduced enough to prevent venting within the threshold time period. There are several ways to handle consuming remaining gaseous fuel and decreasing a pressure of gaseous fuel on the fuel tender.

In one example, a method of reducing LNG tank pressure may include executing a fuel storage routine wherein the vapor (e.g., CNG) in the vapor space of the fuel tender and rail vehicle fluidic couplings (e.g., fuel lines) is reduced and consumed by the engine of the rail vehicle. Specifically, the fuel storage routine may include reducing and eventually stopping the conversion of LNG to CNG and sending any remaining CNG in the vapor space and/or fuel lines of the natural gas fuel system to the rail vehicle engine for consumption.

In one example, reducing the conversion of LNG to CNG (e.g., reducing vaporization) may include gradually ramping down the conversion of LNG to CNG until the vaporizer eventually stops operating. At the same time, the supply of LNG from the LNG tank and to the vaporizer may be gradually reduced until no more LNG is supplied from the LNG tank. In another example, reducing the conversion of LNG to CNG may include stopping sending LNG to a vaporizer of the fuel tender and/or inactivating the vaporizer. By using the remaining vapor in the CNG fuel lines and LNG storage tank, the pressure and heat load in the LNG storage tank may be reduced. As a result, fuel efficiency may increase and the number of pressure relief valve opening events may decrease.

As the vapor space pressure and pressure of the CNG in the CNG supply lines decreases, the pressure of the CNG received at the locomotive engine may also decrease. During vehicle operation, in some embodiments, only CNG at a pressure greater than a threshold supply pressure may be accepted and consumed by the locomotive engine. For example, fuel supply valves such as CNG supply valve 156 and/or gaseous fuel supply regulator valve 190 may be set to only allow CNG over the threshold pressure (e.g., threshold supply pressure) to pass through the valves and to the engine. Thus, if the gaseous fuel supply pressure is greater than a threshold supply pressure, the controller of the rail vehicle may send a signal to the fuel tender to stop vaporizing and the engine of the rail vehicle may then use the already vaporized gaseous fuel. In some embodiments, the vapor space gases from the LNG storage tank may be pulled from the tank and combined with the already vaporized CNG. The combined vapor space gases and CNG may then be received at the locomotive engine for consumption. Pulling vapor space gases out of the fuel tank may further reduce the vapor space pressure of the LNG storage tank.

Alternatively, if the gaseous fuel supply pressure is less than the threshold supply pressure, the controller may adjust operation of the rail vehicle to accept the lower pressure gaseous fuel. In one example, the controller may adjust one or more valves (e.g., pressure settings of gaseous fuel supply regulator valve 190 or valve 156 shown in FIG. 2) to allow CNG at a pressure lower than the threshold supply pressure to flow to the locomotive engine and be subsequently consumed. In another example, the controller may adjust one or more valves (such as valve 192 shown in FIG. 1) allowing the CNG to bypass pressure regulators or high pressure components. In another example, a substitution ratio of CNG to primary fuel (e.g., diesel fuel) used at the engine may be reduced.

The fuel storage routine may further include reducing a manifold pressure (MAP) of the engine of the rail vehicle. Reducing the MAP may enable the pressure in the natural gas fuel system fuel lines and LNG storage tank to decrease further while still transferring CNG to the rail vehicle engine (e.g., locomotive engine). Specifically, reducing the MAP may optimize the use of the lower pressure CNG (e.g., CNG at a pressure lower than the threshold supply pressure) at the rail vehicle engine.

In one example, the MAP may be reduced by decreasing a speed of the rail vehicle engine, or lowering a notch setting of the rail vehicle (or more generally, lowering a throttle setting of a vehicle). As a result, a horsepower of the rail vehicle may decrease, thereby decreasing MAP. The lowering of the notch setting or engine speed may be performed automatically by the locomotive controller as part of the fuel storage routine or performed manually by a rail vehicle operator. In one example, the notch lowering may be sequenced through the consist so that all LNG powered locomotives in the consist do not lower the notch setting at the same time. For example, a first LNG powered locomotive may reduce a notch setting, thereby allowing the first LNG powered locomotive to receive CNG at a lower pressure. At the same time, the notch setting of a second LNG powered locomotive in the same consist may maintain or increase a notch setting in order to maintain a designated vehicle speed. In another example, the MAP may be reduced by adjusting a waste gate and/or compressor recirculation valve.

In yet another example, the pressure of CNG on board the fuel tender may be decreased by re-liquefying the CNG using a re-liquefying device such as a boil-off gas compressor. The re-liquefying device may be disposed on board the fuel tender or be part of a wayside device.

The fuel storage routine may be executed during times when CNG may not be needed by the engine of a rail vehicle. For example, when the rail vehicle is coming to an end of its route (e.g., stopping) or enters an idle mode for a prolonged period of time, CNG may not be required to power the engine. Under conditions wherein CNG may not be needed for a period of time, the fuel storage routine may be initiated either automatically in response to rail vehicle operating conditions and/or manually by the rail vehicle operator.

In one example, the fuel storage routine may be triggered in response to a global positioning system (GPS) of the rail vehicle indicating that the rail vehicle is within a threshold distance of a stopping location. For example, the rail vehicle may be traveling in an area with geofence location markers. The location markers may indicate automatically to the locomotive controller a position of the rail vehicle with respect to the stopping location. In another example, the fuel storage routine may be triggered manually by the rail vehicle operator. For example, the rail vehicle may manually activate a control which activates the fuel storage routine, including reducing the rail vehicle speed and stopping the conversion of LNG to CNG.

In yet another example, the fuel storage routine may be triggered by an energy management system of the rail vehicle. The energy management system may be included in the locomotive/rail vehicle controller of the rail vehicle. Specifically, the energy management system may trigger the fuel storage routine based on a distance of the rail vehicle from a stopping location, a speed of the rail vehicle, an amount of CNG in the fuel lines of the fuel tender and rail vehicle, a pressure of the CNG in the vapor space and fuel supply lines, and the MAP of the engine of the rail vehicle. For example, the energy management system may determine when is the optimal time in the rail vehicle's route to decrease engine speed, lower the notch setting, and/or adjust another operating parameter (such as adjusting a waste gate) in order to lower MAP and begin consuming the remaining CNG. In some examples, the controller may not adjust MAP if a certain MAP is required to maintain vehicle operating conditions. In this case, the rail vehicle engine may consume as much of the CNG as possible given other rail vehicle constraints (e.g., such as a demanded MAP for vehicle power requirements).

In another example, the fuel storage routine may be triggered by the rail vehicle or the fuel tender responsive to CNG vapor space pressures (e.g., pressure of the CNG in the LNG tank). For example, if the CNG vapor space pressure is greater than a first threshold pressure, the fuel storage routine may be triggered in order to reduce the vapor space pressure. In this example, the first threshold pressure may be a pressure above a standard pressure of the LNG tank. The first threshold pressure may indicate the vapor space pressure approaching a threshold pressure that may result in opening of the LNG tank pressure relief valve. In response to the CNG vapor space pressure increasing above the first threshold pressure, the fuel routine may be executed to lower CNG vapor space pressure as much as possible without degrading engine performance. In another example, the fuel routine may be executed responsive to the CNG vapor space pressure increasing to or above a second threshold pressure, the second threshold pressure being greater than the first threshold pressure. In this example, the fuel routine may be executed in order to reduce the vapor space pressure below the second or first threshold pressure as quickly as possible. As a result, engine performance may be reduced in order to effectively reduce the vapor space pressure and reduce the likelihood of the pressure relief valve opening.

In still another example, the fuel storage routine may be triggered in response to a fuel storage request indicating that the fuel tender must be transitioned into a tanker mode and fluidly de-coupled from the rail vehicle. In one example, the fuel storage routine may be initiated if a duration until a required pressure relief event is less than a threshold duration. The threshold duration may be based on regulatory standards for operating the fuel tender in a fuel storage mode (e.g., tanker mode). The duration until the required pressure relief event may be based on a time until a vapor space pressure of the LNG storage tank reaches a threshold level for venting the gases from the fuel tank to atmosphere, where the vapor space pressure is based on a temperature and volume of LNG in the LNG storage tank.

In this way, a method for operating a rail vehicle system may include sending from a controller of a rail vehicle a request to a fuel tender to reduce a pressure of gaseous natural gas on the fuel tender. As described above, the fuel tender may be coupled to the rail vehicle. In one example, reducing the pressure of gaseous natural gas on the fuel tender may include reducing a rate of converting liquid natural gas to gaseous natural gas. The request to reduce the pressure of gaseous natural gas may be sent in response to a fuel storage request. Additionally, a manifold pressure of an engine of the rail vehicle may be reduced based on the fuel storage request, the reduced pressure of the gaseous natural gas and additional vehicle operating conditions. Decreasing the manifold pressure of the engine may include decreasing engine speed or decreasing a notch setting of the rail vehicle.

In one example, the fuel storage request may be generated in response to a request from an operator of the rail vehicle. In another example, the fuel storage request may be generated in response to global positioning system coordinates indicating the rail vehicle is within a threshold distance of a stopping location. In yet another example, the fuel storage request may be generated in response to a request from an energy management system, the request based on one or more of a distance from a stopping location, an amount of natural gas in fuel lines of the rail vehicle, a speed of the rail vehicle, and the manifold pressure. In yet other examples, the fuel storage request may be generated in response to a pressure within a liquid natural gas storage tank increasing above a threshold pressure, the threshold pressure based on a pressure triggering opening of a pressure relief valve.

Sending the request to the fuel tender to reduce converting liquid natural gas to gaseous natural gas includes sending a request to the fuel tender to stop converting liquid natural gas to gaseous natural gas with a vaporizer and/or stopping sending liquid natural gas to the vaporizer.

Figure 3:
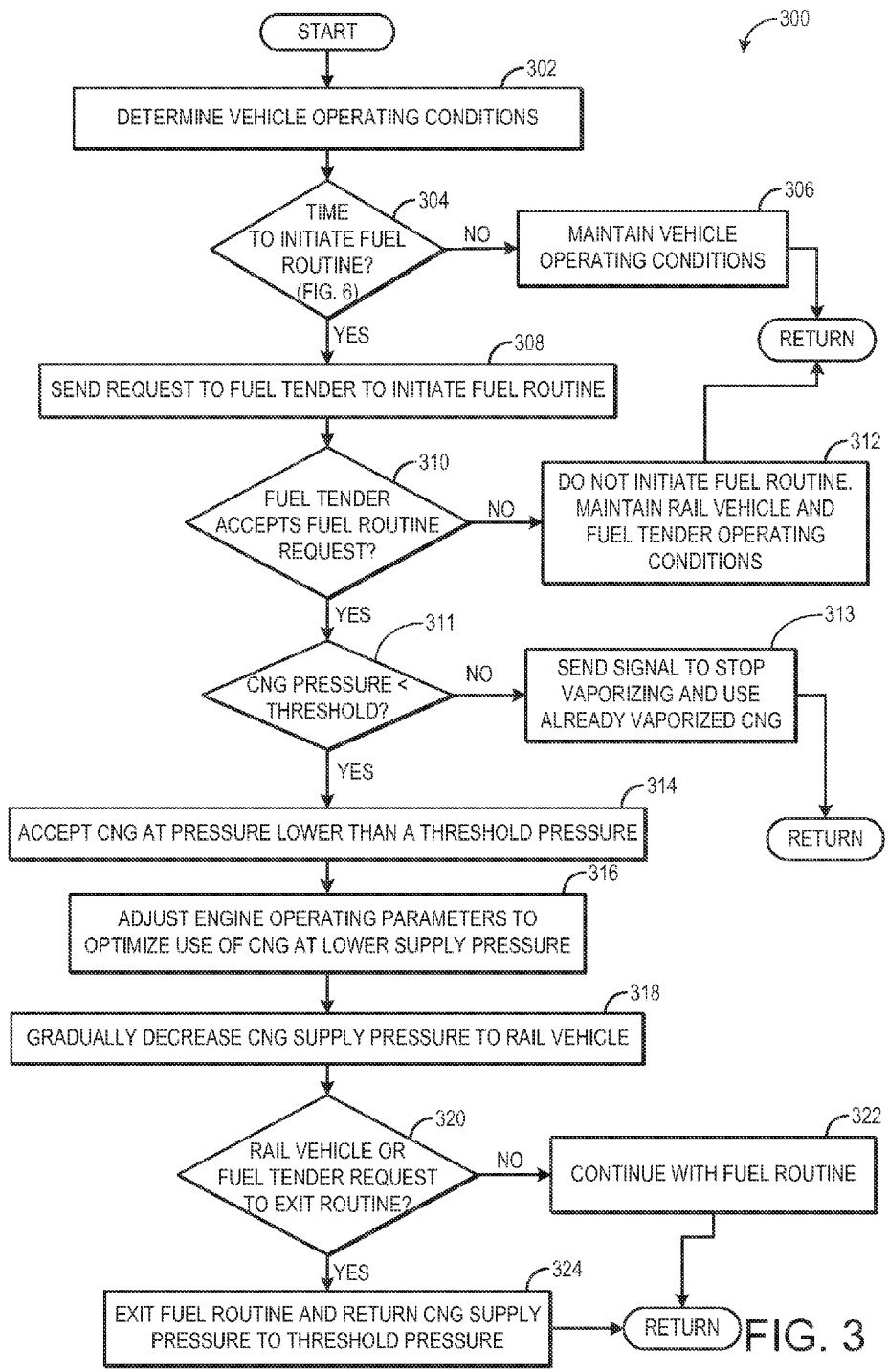
FIG. 3 shows a flow chart of a method for initiating a fuel routine for a gaseous fuel system according to an embodiment of the invention.

Turning now to FIG. 3, a method 300 is shown for initiating a fuel routine for a gaseous fuel system (e.g., a gaseous fuel system of a rail vehicle or other vehicle). Specifically, the method 300 shows reducing a pressure of gaseous component on the fuel tender in response to one or more vehicle operating conditions. That gaseous component may include gaseous fuel and/or gases in a vapor space of a liquid fuel tank on the fuel tender. Reducing the pressure of the gaseous component may be part of a fuel storage routine to prepare the vehicle for a period of reduced fuel usage such as stopping or idling or to prepare the fuel tender for a storage mode wherein it is fluidly de-coupled from the vehicle to which it is mechanically coupled. In one example, the vehicle is rail vehicle with a multi-fuel engine. In this example, the gaseous fuel system may be a natural gas fuel system wherein liquid natural gas (LNG) is stored in a fuel tank or container (e.g., LNG storage tank 212 shown in FIG. 2) on a fuel tender, the fuel tender coupled to the rail vehicle. Thus, the fuel storage routine for the fuel tender may be triggered responsive to rail vehicle operating conditions such as pending idle periods wherein natural gas in not required to power the engine of the rail vehicle and/or fuel tender operating conditions such as a vapor space pressure of the LNG tank being above a threshold pressure. As such, the fuel storage routine may include decreasing a pressure and heat load of the LNG storage tank on the fuel tender (e.g., decreasing the vapor space pressure). In one example, instructions for executing the method 300 may be stored in a memory of the controller of a rail vehicle, such as the first locomotive controller 136 of the first locomotive 100 shown in FIG. 2. In alternate embodiments, the method 300 may be provided for a different type of vehicle with an alternate type of fuel or fuel system.

The method begins at 302 by determining operating conditions of the rail vehicle and fuel tender. Operating conditions of the rail vehicle and fuel tender include a speed of the rail vehicle, rail vehicle engine speed and load, an amount of CNG in the fuel lines (e.g., fuel supply lines) of the natural gas fuel system, an amount of CNG in the LNG storage tank, a pressure of the CNG in the fuel supply lines and the LNG storage tank (e.g., vapor space pressure), MAP of the rail vehicle engine, or the like.

At 304, the method includes determining if it is time to initiate the fuel routine. In one example, the fuel routine may include preparing the rail vehicle and fuel tender to store fuel (e.g., store the natural gas). In another example, the fuel routine may include decreasing a CNG vapor space pressure. As such, the fuel routine may include reducing the conversion of LNG to CNG to reduce the pressure of CNG in the vapor space and CNG supply lines. As discussed above, in one example, a rail vehicle operator may manually initiate the fuel routine. Manually initiating the fuel routine may include manually requesting a decrease in the conversion and supply of CNG and/or manually decreasing rail vehicle speed. In another example, the fuel routine may be initiated in response to the controller of the rail vehicle receiving global positioning coordinates indicating the rail vehicle is within a threshold distance of a determined location. In one example, the determined location may be a stopping location or an end of a route of the rail vehicle. In yet another example, the fuel routine may be initiated based on status information from an energy management system, global positioning system coordinates regarding a distance of the rail vehicle from the determined location, a pressure of CNG in the CNG vapor space and supply lines (e.g., such as the LNG fluidic coupling 226, CNG fluidic coupling 216, CNG fluidic coupling 114, and/or pass through fluidic coupling 160 shown in FIG. 2), a speed of the rail vehicle, and/or the MAP. For example, the energy management system may determine when is the optimal time in the rail vehicle's route to lower MAP and begin consuming the remaining CNG. In one example, if there is a larger amount of CNG remaining in the CNG fuel supply lines at a higher pressure the fuel storage routine may be initiated earlier than if there is a smaller amount of CNG remaining in the CNG fuel supply lines at a lower pressure. In another example, if the remaining route of the rail vehicle includes a down-grade, the fuel routine may be executed sooner than if there were no down-grade in the route.

In another embodiment, the fuel routine may be initiated responsive to a vapor space pressure (e.g., pressure of CNG in the LNG tank) greater than a threshold vapor space pressure. As discussed above, when the vapor space pressure reaches a threshold pressure relief pressure, a pressure relief valve of the LNG tank opens. In order to reduce the amount of pressure relief valve events, the fuel routine may be executed to lower the vapor space pressure of the tank when the vapor space pressure approaches the threshold pressure relief pressure. In a first example, when the vapor space pressure of the LNG tank is greater than a first threshold pressure, the fuel routine may be initiated. In a second example, when the vapor space pressure of the LNG tank is greater than a second threshold pressure, the second threshold pressure being greater than the first threshold pressure, the fuel routine may be initiated. In this example, a response time for executing the fuel routine and performing the subsequent steps of the routine (as described below) may be reduced. As such, the vapor space pressure may decrease at a faster rate with decreasing vapor space pressure taking higher priority over engine performance (e.g., MAP may be decreased even if it is requested at a higher rate, as discussed further below).

Further details on determining when to initiate the fuel routine are presented in the method of FIG. 6. For example, method 600 may be part of the method of 304. Turning to FIG. 6, the method 600 more specifically shows initiating the fuel routine responsive to a plurality of engine operating conditions and/or signals received at the controller of the rail vehicle. At 602, the method includes estimating a duration until a required pressure relief event of the liquid fuel tank on the fuel tender. In one example, the required pressure relief event includes opening of a pressure relief valve of the liquid fuel tank to vent boil-off gases from the liquid fuel tank to atmosphere. The required pressure relief event may occur automatically (e.g., the pressure relief valve may open automatically) when a vapor space pressure of the liquid fuel tank reaches a threshold level for venting gases. The duration until the required pressure relief event may be based on a time until the vapor space pressure of the fuel tank reaches the threshold level for venting gases (e.g., venting the gaseous component) from the fuel tank to atmosphere, where the vapor space pressure is based on a temperature and volume of liquid fuel in the fuel tank. In another example, the vapor space pressure may be estimated and/or measured with a pressure sensor disposed within the fuel tank.

Method 600 continues on to 604 to determine if there is a fuel storage request. As described above, the fuel storage request may be generated manually by a vehicle operator (e.g., when wanting to transition the fuel tender into a storage or tanker mode) or automatically at the controller in response to vehicle operating conditions and/or signals received at the controller from the fuel tender, as described above with reference to step 304 of method 300. If there is a fuel storage request, the method continues on to 606 to determine if the duration until the required pressure relief event is less than a threshold duration. The threshold duration may be based on one or more regulatory standards for storing liquid fuel and fluidly de-coupling a fuel tender from a rail vehicle. For example, the threshold duration may be a number of days until the pressure relief valve of the liquid fuel tank is predicted to open to vent gases from the tank. If the duration until the required pressure relief event is greater than the threshold duration, then the method continues to 608 to fluidly de-couple the rail vehicle from the fuel tender. The method at 608 may include adjusting one or more valves or detachable couplings in the gaseous fuel lines between the fuel tender and rail vehicle such that no gaseous fuel flows to the rail vehicle from the fuel tender.

Alternately at 606, if the duration until the required pressure relief event is less than the threshold duration, then the method continues to 610 to initiate the fuel routine, as described above with regard to FIG. 3. In alternate embodiments, the method at 610 may additionally or alternately include re-liquefying gaseous fuel (e.g., CNG) back into liquid fuel (LNG). The re-liquefying method is described further below with reference to FIG. 7.

Returning to 604, if no fuel storage request is received or generated at the controller, the method continues on to 612 to determine if the vapor space pressure of the liquid fuel tank (e.g., LNG storage tank) is greater than a threshold pressure. The threshold pressure may be based on regulatory requirements, including the threshold duration required for storing fuel without a pressure relief event. The vapor space pressure may either be estimated based on a temperature and volume of liquid fuel in the fuel tank or measured with a pressure sensor disposed within the fuel tank. If the vapor space pressure is greater than the threshold pressure, the method continues on to 614 to pull the gaseous fuel (e.g., vapors) from the fuel tank and combine the vapors to the CNG supply lines (e.g., to the supply lines downstream of the vaporizer). As such, CNG within the LNG storage tank may be combined with already vaporized CNG and then the combined gases may be sent to the engine of the rail vehicle for consumption. In some embodiments, the method at 614 may be optional. The method then continues on to 610 to initiate the fuel routine described in method 300 of FIG. 3

Returning to 612, if the vapor space pressure is not greater than the threshold pressure, the method continues on to 616 to determine if an amount of CNG within the gaseous fuel system (e.g., in the fuel tank and/or the CNG supply lines and/or the vaporizer) is greater than at threshold amount. If the amount of CNG within the gaseous fuel system is greater than the threshold amount, the method continues to 610 to initiate the fuel routine of FIG. 3 and/or re-liquefy the CNG, as described below with reference to FIG. 7. Otherwise, if the amount of CNG within the gaseous fuel system is not greater than the threshold amount, the method continues to 618 to not initiate the fuel routine.

In one example, the fuel routine is initiated by the rail vehicle (e.g., locomotive controller) in response to one or more of the triggers discussed above. In another example, the fuel routine is initiated by the fuel tender (e.g., tender controller) in response to vapor space pressure or one or the other triggers discussed above.

Returning to FIG. 3, at 304, if the fuel routine has not been triggered indicating that it is not time to begin storing fuel, the method continues on to 306 to maintain vehicle operating conditions. However, if the fuel routine is initiated at 304, the method continues on the 308 to send a request to the fuel tender to initiate the fuel routine. Specifically, the controller of the rail vehicle (e.g., locomotive controller) may send a fuel request to the controller of the fuel tender (e.g., tender controller) to initiate the fuel routine. At 310, the method includes determining if the tender controller accepts the fuel routine request. If the fuel tender does not accept the fuel routine request, the method continues on to 312 to not initiate the fuel routine and maintain the rail vehicle and fuel tender operating conditions. In one example, the fuel tender may not accept the fuel routine request if the vapor space pressure is below the first threshold pressure or a standard operating pressure of the LNG tank.

However, if the fuel tender accepts the fuel routine request, the method continues on to 311 to determine if the CNG supply pressure (e.g., pressure of the CNG flowing to the engine of the rail vehicle) is less than a threshold supply pressure. If the CNG pressure is not less than the threshold supply pressure the method continues to 313 to send a signal to the fuel tender (e.g., to the controller of the fuel tender) to stop vaporizing CNG at the vaporizer and send the already vaporized CNG to the engine of the rail vehicle for consumption.

Alternately, if the CNG pressure is less than the threshold supply pressure, the method continues to 314 to accept CNG at a pressure lower than a threshold supply pressure. Specifically, the method at 314 includes adjusting one or more valves or engine operating conditions in order to allow the rail vehicle engine to accept and consume the supplied CNG, even if the CNG is at a pressure lower than a threshold supply pressure. For example, a method 500 for accepting and consuming CNG at an engine of the rail vehicle, the CNG sent to the rail vehicle from a fuel tender, is shown at FIG. 5 and described further below. In method 500, if the CNG supplied to the rail vehicle engine is below the threshold supply pressure, the CNG will not be accepted and consumed by the engine unless the locomotive controller is currently running the fuel routine. As such, CNG below the threshold supply pressure may only be consumed by the rail vehicle engine if the fuel routine has been initiated.

In one example, the method at 314 may include adjusting the pressure settings of a gaseous fuel supply regulator valve such that CNG with a pressure less than the threshold supply pressure may flow through the regulator valve and to the engine of the rail vehicle. In another example, the method at 314 may include adjusting one or more valves disposed in a bypass to allow the CNG to bypass the regulator valves. In this way, CNG may flow to the engine even when the pressure of the CNG is less than the threshold supply pressure.

Returning to FIG. 3, at 316 the method includes adjusting one or more engine or rail vehicle operating parameters to optimize the use of the CNG at a lower supply pressure. As discussed above, one or more rail vehicle operating conditions may be adjusted in order to reduce MAP so that as much CNG as possible is consumed by the rail vehicle engine, thereby allowing further reduction of vapor space pressure and CNG supply pressure. The one or more rail vehicle operating conditions may include an engine speed, a notch setting (e.g., horsepower setting) of the rail vehicle, a position of waste gate, and/or a position of a compressor recirculation valve. For example, reducing engine speed, reducing the notching setting, increasing the opening of the wastegate, and/or increasing the opening of the compressor recirculation valve may reduce MAP. As a result, the rail vehicle engine may consume more CNG at a lower supply pressure. Lowering the MAP may, in turn, result in a lower residual pressure of the CNG on the fuel tender.

In one example, lowering the MAP at 316 may include only lowering the MAP based on engine operating conditions. For example, the MAP may be lowered only as much as is allowed based on torque demand and power requirements of the rail vehicle. Specially, MAP may be reduced as long as engine or rail vehicle performance is not reduced. In another example, if the need to lower vapor space pressure is more severe (e.g., the vapor space pressure is greater than the second threshold pressure as described above), MAP may be lowered to consume as much CNG as possible, despite degradation of rail vehicle performance. Said another way, degradation of rail vehicle performance may be allowed if reduced MAP is required to reduce vapor space pressure below the second threshold pressure.

In yet another example, the method at 316 may include decreasing a notch setting of a first engine of a first rail vehicle and sending the lower pressure CNG to the first engine. Then, the controller may concurrently increase a notch setting of a second engine of a second rail vehicle coupled in a consist with the first rail vehicle to compensate for the reducing notch setting of the first engine. In still another example, the method at 316 may include decreasing a substitution ratio of CNG to primary fuel (e.g., diesel fuel) at the first engine.

At 318, the method includes gradually decreasing CNG supply pressure to the rail vehicle (e.g., the pressure of the CNG supplied to the engine of the rail vehicle). Specifically, the controller of the rail vehicle (e.g., locomotive controller) may send a fuel request to the controller of the fuel tender (e.g., tender controller) to reduce the CNG supply pressure and reduce the conversion of LNG to CNG. In one example, the method at 318 includes gradually decreasing a supply of LNG from the LNG tank and to the vaporizer. In another example, the method at 318 includes gradually reducing the rate of converting LNG to CNG. The rate of converting may be reduced to a rate of substantially zero such that the vaporizer is inactivated. In some examples, the request sent to the fuel tender may include a request to stop converting LNG to CNG by one or both of stopping sending LNG to the vaporizer and inactivating the vaporizer. In response to the request, the tender controller may adjust one or more valves in the LNG and CNG supply lines (e.g., fluid conduits) and/or a pump speed of one or more fuel pumps (e.g., such as fuel pump 210 shown in FIG. 2). For example, the tender controller may close a valve, such as valve 230, to stop sending LNG to the vaporizer. After stopping sending LNG to the vaporizer and/or inactivating the vaporizer, the method at 318 may include sending any remaining CNG in the CNG fuel lines (e.g., supply lines) to the rail vehicle for consumption.

At 320, the method includes determining if the rail vehicle or the fuel tender has requested to exit the fuel routine. For example, the rail vehicle operator may manually request an increase in MAP and/or rail vehicle power output. In one example, the rail vehicle operator may manually request the increase in rail vehicle power if the rail vehicle cannot stop at the originally determined location. In another example, if there is an error in the global positioning system such that a stopping location of the rail vehicle changes before reaching the originally designated stopping location, the rail vehicle may need to increase power to continue operating and traveling to the updated destination. If there is no request to exit the fuel routine, the method continues on to 322 to continue executing the fuel routine.

Alternatively, if there is a request to exit the fuel routine, the method continues on to 324 to increase the power output of the rail vehicle and send a request to the fuel tender to increase the CNG supply pressure to the threshold supply pressure. For example, the request may include a request to restart the vaporizer and start sending LNG to the vaporizer.

As introduced above with regard to FIG. 3, FIG. 5 shows a method 500 for accepting and consuming CNG at an engine of the rail vehicle, the CNG sent to the rail vehicle from a fuel tender. At 502, the method includes determining vehicle operating conditions. In one example vehicle operating conditions may include vapor space pressure of an LNG storage tank, pressure of the CNG supplied to and received at the rail vehicle, MAP, engine speed and load, or the like. At 504, the method includes determining if the rail vehicle requires CNG. For example, based on engine load and additional operating conditions of the rail vehicle, the controller on the rail vehicle (e.g., locomotive controller) may request CNG from a fuel tender coupled to the rail vehicle. If the rail vehicle does not require CNG, the method continues on to 506 to maintain rail vehicle operating conditions. Alternatively, if the rail vehicle does require CNG, the method continues on to 508 to send a request to the fuel tender to deliver CNG to the rail vehicle.

At 510, the method includes determining if the pressure of the CNG received at the rail vehicle is less than a threshold supply pressure. In one example, the threshold supply pressure may be 827 kPa. In another example, the threshold supply pressure may be larger or smaller than 827 kPa. Under standard operating conditions, CNG may be maintained at or above the threshold supply pressure. If the CNG pressure is not below the threshold supply pressure, the method continues on to 512 to accept the CNG at the locomotive engine and subsequently consume the supplied CNG. However, if the pressure of the CNG is less than the threshold supply pressure, the method continues on to 514 to determine if the locomotive controller is currently running (e.g., executing) the fuel routine. For example, when the fuel routine is initiated and accepted at 308 and 310 in method 300 (as shown in FIG. 3), the locomotive controller may apply a flag that indicates the fuel routine is running. As a result, engine operating conditions such as pressure settings of one or more CNG supply valves may be adjusted.

If the rail vehicle is not currently running the fuel routine, the method continues on to 516 to not accept the CNG at the lower than the threshold supply pressure. Further, the rail vehicle engine may use alternate fuel to power the engine while waiting for the CNG supply pressure to increase. Alternatively, if the rail vehicle is running the fuel routine at 514, the method continues on to 518 to accept the supplied CNG at a pressure lower than the threshold supply pressure. The rail vehicle engine may then consume the CNG at the lower pressure. In this way, during the fuel routine, the rail vehicle engine may consume CNG at a lower pressure than the threshold supply pressure. As a result, the pressure of the CNG in the CNG supply lines and the vapor space pressure may be further reduced.

As also introduced above with regard to FIG. 3 and FIG. 6, FIG. 7 shows a method 700 for re-liquefying CNG. Method 700 beings at 702 by determining if it's time for re-liquefaction of CNG (e.g., time for converting CNG back into LNG). Re-liquefaction may be triggered in response to one or more of a fuel storage request, a duration until a required pressure relief event of a liquid fuel tank on the fuel tender coupled to the vehicle being less than a threshold duration, a vapor space pressure being greater than a threshold pressure, an amount of CNG within the vapor space and/or gaseous fuel system being greater than a threshold amount, and/or upon initiation of a fuel routine. In this way, the re-liquefying routine of FIG. 7 shows one possible method for preparing a fuel tender for a storage mode and decreasing a pressure CNG on board the fuel tender. Re-liquefaction of CNG may be performed by a re-liquefying device such as a boil-off gas compressor on board the fuel tender or a wayside device. If the re-liquefying device is part of a wayside device, re-liquefaction may only occur if the fuel tender is within proximity of the wayside device. If it is not time for re-liquefying CNG, the method continues to 704 to initiate the fuel routine shown in FIG. 3.

Alternatively, if it is time to re-liquefy CNG, the method continues to 706 to generate a re-liquefying request to re-liquefy gaseous fuel in a gaseous fuel system on the fuel tender. The generated request may be sent to the fuel tender. For example, the re-liquefying request may include a request to operate a re-liquefying device, such as a boil-off gas compressor, to convert CNG to LNG and then flow the converted LNG back into the LNG storage tank. At 708, the method includes receiving a signal (at the controller of the rail vehicle) indicating that re-liquefying of the gaseous fuel has been completed. In response, the method may continue to 710 to generate an indication that the fuel tender is ready to be fluidly de-coupled from the vehicle. The indication may include one or more of displaying a visual indication or presenting an audible indication to the vehicle operator. In another example, the indication may include setting a diagnostic flag that the fuel tender is ready to be fluidly de-coupled from the rail vehicle. Continuing to 712, the method includes fluidly de-coupling the rail vehicle (e.g., first locomotive) from the fuel tender. As described above, the method at 712 may include adjusting one or more valves in the fluid lines between the fuel tender and rail vehicle and/or de-coupling detachable interface couplings between the fuel tender and rail vehicle such that no CNG flows between the fuel tender and rail vehicle.

Continuing to FIG. 4, a graph 400 shows example adjustments to CNG supply pressure (e.g., gaseous fuel supply pressure) responsive to initiation of a fuel routine for an example gaseous fuel system, such as the natural gas system described above. Specifically, graph 400 shows changes in a distance from a stopping location of a rail vehicle at plot 402, changes in rail vehicle horsepower (HP) at plot 404, changes in a pressure of the CNG being sent to the engine (e.g., CNG supply pressure) at plot 406, changes in MAP at plot 408, changes in fuel flow (e.g., rate of fuel flow) to a vaporizer at plot 410, changes in vaporizer operation at plot 412, and changes in LNG storage tank pressure (e.g., vapor space pressure) at plot 414. As discussed above, a fuel storage routine for a natural gas system of a fuel tender coupled to a rail vehicle may be initiated in response to the rail vehicle being within a threshold distance of a stopping location. In alternate examples, the fuel storage routine may be initiated responsive to alternate or additional vehicle operating conditions such as when the LNG storage tank pressure increases above a threshold pressure. Further, the vaporizer on the fuel tender may be turned on or off to start or stop the vaporization of LNG to CNG. In other examples, vaporizer operation (and subsequently the rate of converting LNG to CNG) may be increased or decreased by adjusting operation between fully on or fully off.

Prior to time t1, the rail vehicle is farther from a designated stopping location than a threshold distance T1 (plot 402). Additionally, the vaporizer on board the fuel tender is on and LNG is flowing to the vaporizer (plots 412 and 410). As a result, LNG is being converted to CNG. The CNG may then be sent to the engine of the rail vehicle to at least partially power the rail vehicle. The CNG being supplied to the engine is at a threshold pressure T2 (plot 406) which is above the MAP (plot 408). Before time t1 the LNG storage tank pressure increases due to heating in the tank (plot 414). Just before time t1, the LNG storage tank pressure is approaching a threshold pressure relief pressure, P1. At the threshold pressure relief pressure a pressure relief valve of the LNG storage tank may open.

At time t1, the rail vehicle is within the threshold distance T1 of the designated stopping location (plot 402). In one example, the distance information may be received at the rail vehicle controller from a global positioning system of the rail vehicle. In response to the rail vehicle being within the threshold distance T1 of the stopping location, the rail vehicle controller may send a request to the tender controller to reduce the supply pressure of CNG by reducing the conversion of LNG to CNG. As a result, the LNG fuel flow to the vaporizer may gradually decrease to zero between time t1 and time t2. At time t2, the vaporizer is turned off. As shown in FIG. 4, the vaporizer continues operating between time t1 and time t2 in order to vaporize any remaining LNG sent to the vaporizer. In alternate embodiments, the vaporizer may be turned off at time t1.

Also at time t2, the horsepower (HP) of the rail vehicle decreases (plot 404), thereby decreasing the MAP (plot 408). As fuel flow to the vaporizer decreases and the vaporizer is turned off and more CNG is consumed by the engine, the CNG supply pressure decreases (plot 406). At time t3, the distance from the determined stopping location increases above the threshold distance T1 (plot 402). In one example, the change in distance may be a result of an error in the global positioning system. In another example, the change in distance may be due to a change in the stopping location of the rail vehicle. In response to the distance from the stopping location increasing at time t3, a request to increase the CNG supply pressure may be generated. In response, the CNG supply pressure (plot 406) may be increased by increasing the LNG fuel flow to the vaporizer (plot 410) and then turning on the vaporizer (plot 412). As a result of resuming LNG fuel flow and vaporization of the LNG, the CNG supply pressure may increase until the pressure reaches the threshold pressure T2 (plot 406). In some embodiments, the controller of the rail vehicle may additionally or alternatively increase injection of an alternate fuel, such as diesel fuel, at time t3 in order to increase rail vehicle HP. In this way, any lags in supply of CNG to the engine may be compensated for with the supply of the alternate fuel. As such, rail vehicle HP may be maintained at a demanded level while the CNG fuel supply is restarted As shown at time t1 in FIG. 4, during a first condition where a rail vehicle is within a threshold distance of a stopping location, a controller of the rail vehicle may send from the controller of the rail vehicle a request to a fuel tender to reduce a CNG supply pressure. Reducing the CNG supply pressure may include gradually decreasing the conversion of LNG to CNG. During the reducing the CNG supply pressure, the controller may adjust one or more vehicle operating parameters in order to accept and consume CNG at the reduced CNG supply pressure. In one example, an engine speed or notch setting of the rail vehicle may decrease in order to reduce MAP such that the CNG at the reduced CNG supply pressure may be consumed by the engine. Thus, the engine may accept the CNG at a pressure lower than a threshold pressure (e.g., threshold supply pressure) during the first condition.

As shown at time t3, during a second condition, different than the first condition, the controller of the rail vehicle may send a request to the fuel tender to increase the CNG supply pressure to the threshold supply pressure, thereby requesting the fuel tender to resume converting liquid natural gas to gaseous natural gas. The second condition may include a request to increase the HP of the rail vehicle following a fuel storage request. The request to increase the HP of the rail vehicle may be in response to a change in the distance from a designated stopping location of the rail vehicle.

In this way, executing a fuel storage routine in response to pending engine idle and/or vehicle stopping conditions, or increased pressure in a liquid fuel storage tank (e.g., LNG vapor space pressure), may help to conserve fuel of the rail vehicle. Specifically, the fuel storage routine as described above may allow for a decrease in the pressure and heat load of a fuel container, such as an LNG storage tank of a fuel tender. By decreasing the pressure of the natural gas fuel system and the LNG storage tank, venting of the tank may be reduced. A reduction in venting events may both conserve fuel while also reducing an amount of contaminants released into the environment.

As one embodiment, a method comprises sending from a controller of a vehicle a fuel request to a fuel tender to reduce a pressure of gaseous fuel on the fuel tender and adjusting one or more vehicle operating parameters to allow consumption of the gaseous fuel at an engine of the vehicle when the pressure of the gaseous fuel is below a threshold supply pressure. The method further comprises responding to an operator of the vehicle to initiate the sending of the fuel request.

In one example, the method further comprises receiving global positioning system coordinates indicating the vehicle is within a threshold distance of a determined location and responding to the receiving of the coordinates to initiate the sending of the fuel request. In another example, the method further includes receiving status information from an energy management system, the status information based on global positioning system coordinates regarding a distance of the vehicle from a determined location, an amount of gaseous fuel in fuel lines of the vehicle, the pressure of the gaseous fuel on the fuel tender, a speed of the vehicle, and an intake manifold pressure; and responding to receiving the status information by initiating the sending the fuel request.

As described above, the pressure of gaseous fuel on the fuel tender includes one or more of a pressure of gaseous fuel in a liquid fuel tank and a pressure of gaseous fuel in gaseous fuel supply lines. In one example, the method further includes initiating the sending the fuel request in response to the pressure of the gaseous fuel in the liquid fuel tank being greater than a second threshold pressure, the second threshold pressure based on a pressure which results in opening of a pressure relief valve coupled to the liquid fuel tank.

Adjusting the one or more vehicle operating parameters includes adjusting one or more of an engine speed, a notch setting, a position of a waste gate, or a position of a compressor recirculation valve to decrease intake manifold pressure of the engine and allow consumption of the gaseous fuel below the threshold supply pressure. In another example, the adjusting one more vehicle operating parameters includes adjusting pressure settings of one or more valves to allow passage of the gaseous fuel below the threshold supply pressure from the fuel tender to the engine.

The gaseous fuel comprises gaseous natural gas and the method further comprises sending a signal from the vehicle to the fuel tender to decrease the pressure of the gaseous fuel on the fuel tender and, responsive to the signal, reducing a rate of converting liquid natural gas to gaseous natural gas by one or both of reducing the sending liquid natural gas to a vaporizer on board the fuel tender or reducing vaporization at the vaporizer.

As another embodiment, a control system for a vehicle comprises a controller operable to initiate a fuel routine for a gaseous fuel system and to request a reduction in a supply pressure of gaseous fuel of the gaseous fuel system via one or more of a reduction in a rate of vaporization of liquid fuel remote from the vehicle or a reduction in a supply of the vaporized fuel to the vehicle. The controller is further operable to adjust one or more engine operating parameters in order to accept the gaseous fuel at a pressure lower than a threshold pressure, the one or more engine operating conditions including a pressure setting of a gaseous fuel supply valve, an engine speed, a notch setting of the engine, a waste gate position, and a compressor bypass valve position.

As yet another embodiment, a vehicle system comprises a controller configured to be disposed on a vehicle and that is operable to send a fuel request from the vehicle to a fuel tender coupled to the vehicle to adjust a gaseous fuel supply pressure below a threshold supply pressure at least partially by decreasing a rate of conversion of liquid fuel to gaseous fuel and control a manifold pressure of an engine of the vehicle. The vehicle system further comprises a global positioning system in communication with the controller that is operable to provide vehicle coordinates to the controller, and wherein the controller is further operable to determine a distance between the vehicle coordinates and a determined location, and to respond to a the distance being less than a threshold distance value by initiating the fuel request.

The vehicle system further comprises a plurality of sensors operable to determine the manifold pressure and to determine the gaseous fuel supply pressure, the sensors being coupled to the controller, and wherein the controller is further operable to control the manifold pressure based on the gaseous fuel supply pressure. Additionally, the vehicle system comprises a vaporizer operable to convert the liquid fuel to the gaseous fuel and wherein the controller is further operable to control operating parameters of the vaporizer. The vaporizer comprises a pump, motor, and valve, and wherein the controller is operable to control at least one of the pump, motor, and valve. The controller is further operable to control a flow of thermal fluid from the vehicle to a vaporizer and thereby to control the rate of conversion of the liquid fuel to the gaseous fuel.

Additionally, the controller is coupled to an automatic engine start stop (AESS) device that is configured to shut down the engine when the engine is in idle, and prior to the AESS device shutting down the engine, the controller is operable to send the fuel request to decrease the rate of conversion of liquid fuel to gaseous fuel. The vehicle system is part of a consist of vehicles having at least the vehicle and a lead vehicle, the vehicle comprising a trail vehicle, and the controller is on the trail vehicle and is operable to initiate the AESS device at least one of more frequently, for a longer duration, or after a shorter idle period than if the trail vehicle was the lead vehicle. Said another way, the vehicle is a trail vehicle in a consist of vehicles, the consist of vehicles also including a lead vehicle. In some examples, additional vehicles may be positioned between the lead vehicle and the trail vehicle. In other embodiments, the vehicle may be the lead vehicle or positioned between a lead vehicle and a trail vehicle of the consist.

As another embodiment a method comprises operating a vehicle system by at least one of responding to a changing engine speed for an engine on a vehicle by controlling a pressure ratio between a first pressure of a gaseous fuel supply to the engine and a second pressure of an air intake manifold to the engine so that the first pressure is greater than the second pressure and the ratio is in a determined range of ratio values regardless of changes in the second pressure caused by the changing engine speed or responding to the first pressure changing by controlling the engine speed so that the ratio is in the determined range of ratio values. In one example, the determined range of ratio values is a pre-determined or designated range of ratio values for the engine. For example, the determined range of ratio values may be a range of ratio values pre-set in a controller of the vehicle system. Further, the vehicle system responds to the changing first pressure by controlling the engine speed so that the ratio is in the determined range of ratio values, the method further comprising maintaining the vehicle speed constant while the engine speed changes to maintain the ratio value.

In another embodiment, the systems of FIGS. 1-2 provide for a system of mechanically coupled rail vehicles, comprising a first rail vehicle including a fuel container containing liquefied natural gas, a second rail vehicle having a multi-fuel engine, the second rail vehicle configured to fluidly and mechanically couple to the first rail vehicle, and a controller on board the second rail vehicle, the controller configured to store an initial fuel volume measurement for the fuel container of the first rail vehicle and modify the initial fuel volume measurement based on fuel consumption of an engine of the second rail vehicle to determine a modified fuel volume.

As discussed above, a fuel container (also referred to as liquid fuel tank or LNG storage tank) may be located on a first rail vehicle while a second rail vehicle includes a multi fuel engine and an engine controller. The multi fuel engine may then use fuel from the fuel container to at least partially power the second rail vehicle. In one example, as shown at FIGS. 1-2, the first rail vehicle is the fuel tender 110, the second rail vehicle is the first locomotive 100, the fuel container is the LNG storage tank 212, the multi fuel engine is the primary engine 118, and the engine controller is the first locomotive controller 136.

In other embodiments, the LNG storage tank may be another type of fuel container located on a first rail vehicle. A second rail vehicle may include a multi fuel engine and an engine controller. The multi fuel engine may then use fuel from the fuel container to power the second rail vehicle.

Measurements of an amount (e.g., volume) or level of fuel in the fuel container may be taken at the fuel container on the fuel tender. Different procedures may be used to determine the fuel level at the fuel container. In one example, the method of measuring the fuel level of the fuel container may include a bubbler method. With the bubbler method, vaporized LNG within the fuel container is used to make CNG that is bubbled into a bottom of the fuel container via an air tube. A pressure gauge or sensor measures the air pressure in the air tube. The differential pressure between the air pressure in the air tube and the fuel container (e.g., tank) represents the pressure of the fluid column in the fuel container and is therefore proportional to the fluid level (e.g., depth of fluid) in the fuel container. Additionally, the fuel level may be based on a geometry of the fuel container. The geometry of the fuel container and the differential pressure may then be used to determine the fuel volume, or mass of fuel, of the fuel container. However, measuring the fuel volume in this way may only be accurate when the fuel tender is stationary or moving below a threshold speed and/or threshold acceleration. When the fuel tender is moving, the fluid level of the fuel container may not be consistent, thereby reducing the accuracy of the bubbler method fuel level measurement.

In alternate embodiments, the fuel volume of the fuel container may be determined using an alternate method such as an ultrasonic or float method. In both of these methods, the fuel volume measurement may still be inaccurate while the fuel tender and fuel container is in motion (e.g., the rail vehicle is moving).

During rail vehicle operation, fuel level, fuel volume, or fuel mass measurements of the fuel container taken on the fuel tender may be sent to a controller of a rail vehicle, such as the first locomotive controller 136 of the first locomotive 100 shown in FIGS. 1-2. In one example, the locomotive controller 136 may convert a fuel level measurement from the fuel tender to a fuel volume or fuel mass based on the geometry of the fuel container. In another example, the tender controller may determine the fuel volume or fuel mass in the fuel container and then send the fuel volume or fuel mass measurement to the locomotive controller. As used below, the fuel value or measurement sent from the fuel tender to the locomotive is a fuel volume of the fuel container. However, in alternate embodiments this fuel value may be any one of a fuel level, fuel volume, or fuel mass of the fuel container of the fuel tender.

In some examples, the fuel volume measurement may only be stored within the first locomotive controller when the first locomotive is stationary. Since the fuel tender is coupled to the first locomotive, the fuel tender is also stationary when the first locomotive is stationary. In other examples, the fuel volume measurement may only be stored within the first locomotive controller when a speed of the first locomotive is less than a threshold speed for a threshold duration. As a result, the fuel volume measurement stored within the first locomotive controller may have a higher level of accuracy. Fuel volume measurements measured on the fuel tender and received at the first locomotive controller when the first locomotive is moving may then be discarded and not stored within the controller.

During engine operation, when the rail vehicle (e.g., first locomotive) is moving, the stored fuel volume may be modified and updated based on fuel consumption of the engine (e.g., primary engine of the first locomotive). Specifically, as the engine of the rail vehicle consumes fuel, the amount (e.g., mass, volume, or the like) of CNG consumed may be subtracted from the stored fuel volume to determine a modified fuel volume of the fuel container. The amount of CNG consumed by the engine may be based on one or more of a fuel efficiency of the rail vehicle, the speed of the rail vehicle, a flow rate of fuel from the fuel container and into the engine of the rail vehicle, a total amount of energy in engine cylinders, and an energy contribution of natural gas in the engine cylinders. Further details on determining fuel consumption of the engine are discussed below with reference to FIG. 8.

A measurement of the volume of fuel inside the fuel container may affect engine operation of the first locomotive and/or the second locomotive and refueling of the fuel tender. For example, when the fuel volume reaches a lower threshold volume, refueling of the fuel container of the fuel tender may be required. Additionally, if the fuel volume reaches the lower threshold volume, the engine of the first locomotive may adjust the percentage of CNG used at the engine. Specifically, the engine of the first locomotive may consume a higher percentage of diesel fuel or other alternate fuel when the LNG fuel volume in the fuel container is low. As such, the locomotive engine may continue operating while waiting for refueling of the LNG fuel container. In another example, the locomotive controller may switch to receive its CNG supply from another fuel container (e.g., a second fuel container) in the consist when the fuel volume of a first fuel container decreases below the lower threshold volume. Further actions based on the fuel level measurement are discussed below with reference to FIG. 8.

In this way, a method may include receiving a fuel value measured at a fuel container on a fuel tender, storing the fuel value and a corresponding time stamp when a speed of a rail vehicle is below a threshold speed for a duration, and modifying the fuel value based on fuel consumption of an engine of the rail vehicle to determine a modified fuel value. The fuel value is one or more of a fuel level and an amount of fuel in the fuel container, the amount of fuel based on the fuel level and a geometry of the fuel container and the amount of fuel being one or more of a volume of fuel or a mass of fuel in the fuel container.

In one example, storing the fuel value and the corresponding time stamp includes storing the fuel value and a time at which the fuel value is received within a memory of a controller of the rail vehicle. The fuel value stored in the controller is an initial fuel value and the method further includes updating the initial fuel value stored in the controller when the speed of the rail vehicle decreases below the threshold speed for the duration. The method further includes storing the fuel value when the fuel value is received at a time when the rail vehicle is stopped. Modifying the fuel value then includes modifying the fuel value stored in a controller of the rail vehicle after the rail vehicle is re-started.

The method further includes displaying the modified fuel value to an operator of the rail vehicle. Additionally, modifying the fuel value based on fuel consumption includes subtracting a mass of fuel consumed by the engine since the time stamp from the fuel value and wherein the mass of fuel consumed by the engine is based on one or more of a fuel efficiency of the rail vehicle, a flow rate of fuel from the fuel container and into the engine, a total amount of energy in engine cylinders, and an energy contribution of natural gas in the engine cylinders.

Figure 8:
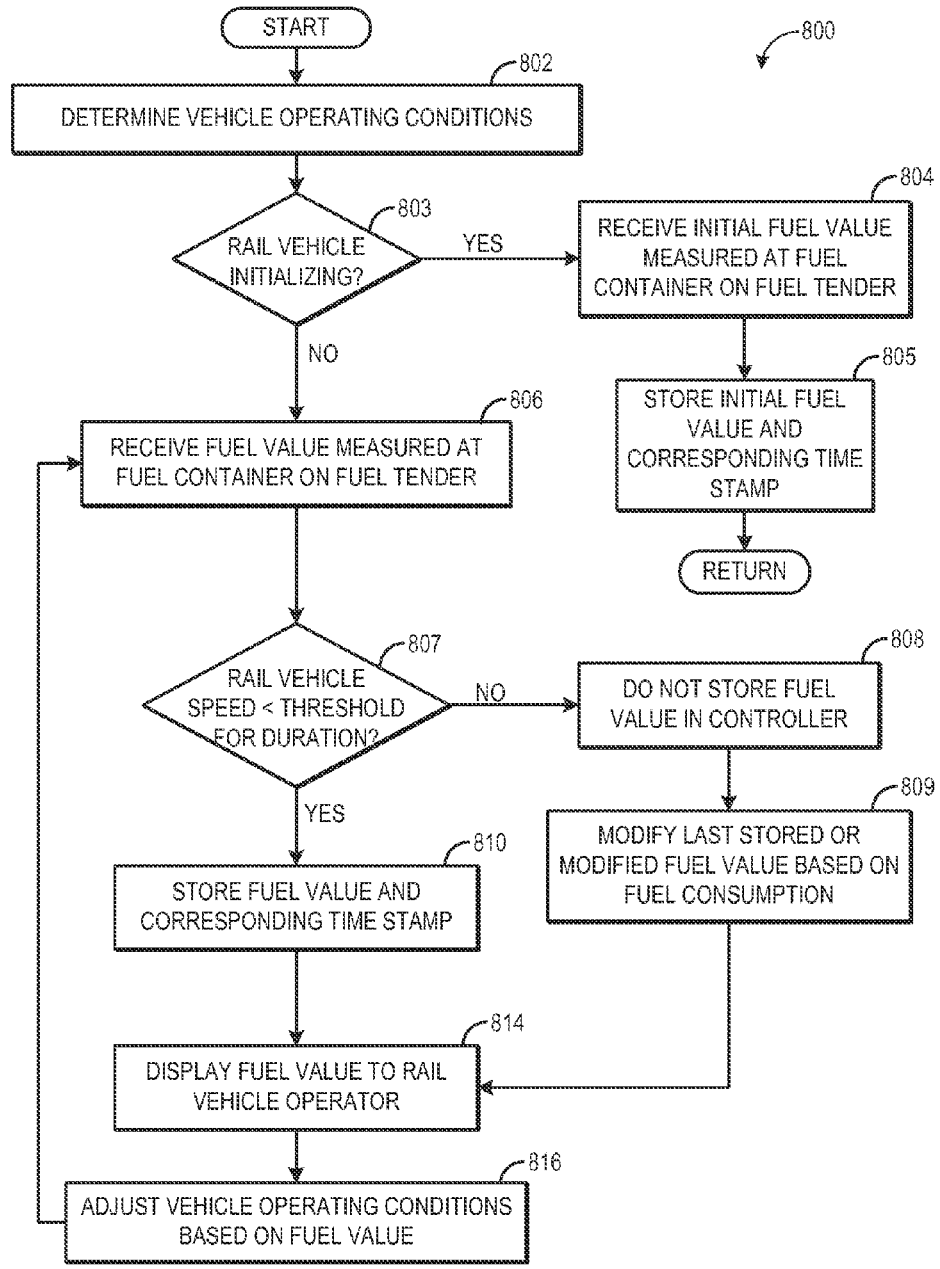
FIG. 8 shows a flow chart of a method for determining a modified fuel value of a fuel container based on engine operating conditions according to an embodiment of the invention.
Figure 9:
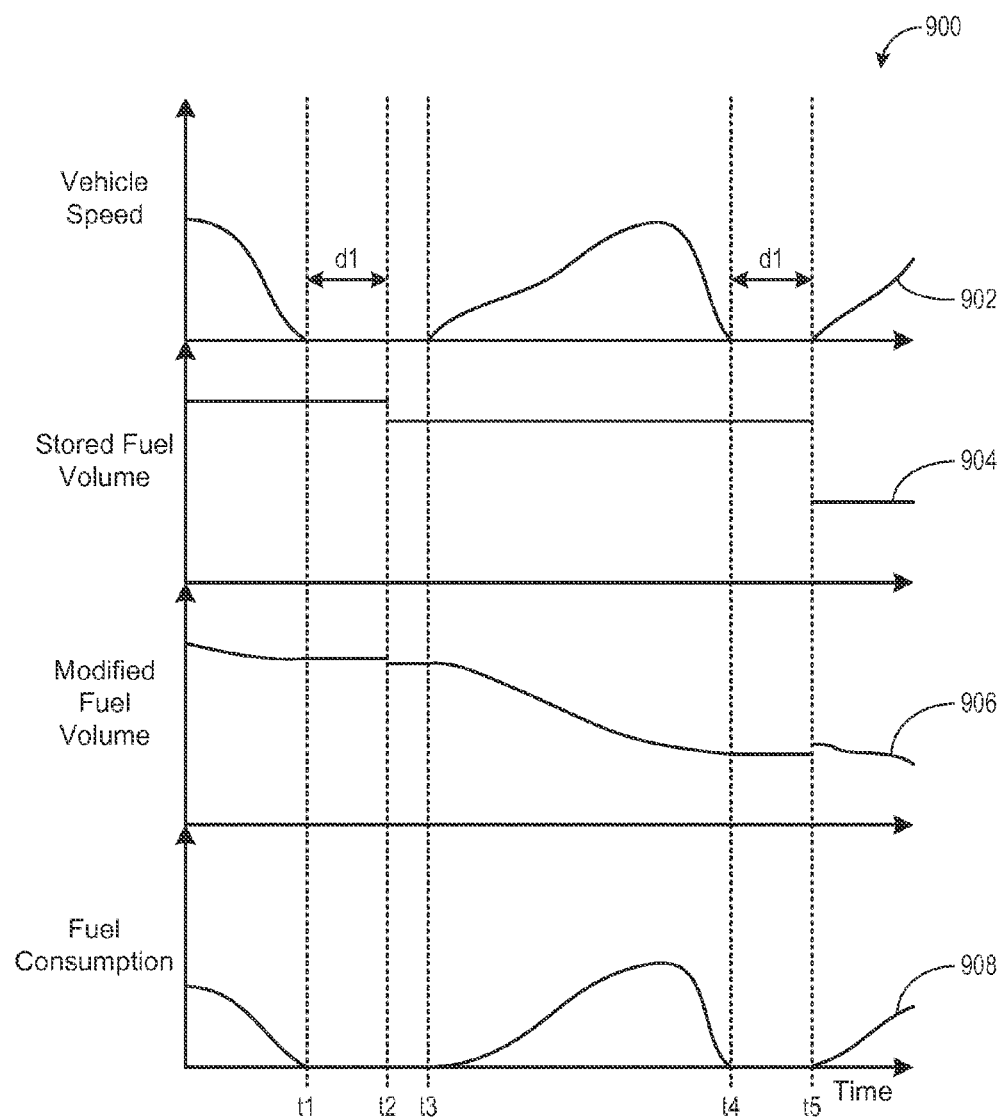
FIG. 9 shows a graphical example of storing and modifying a fuel volume of a fuel container based on fuel consumption of a locomotive engine according to an embodiment of the invention.

Turning now to FIG. 8, a method 800 is presented for determining a modified fuel volume of a fuel container based on engine operating conditions. In one example, instructions for executing the method 800 may be stored in a memory of a controller of a rail vehicle, such as the first locomotive controller 136 of the first locomotive 100 shown in FIG. 2. Additionally, in one example, the fuel container is on a fuel tender, the fuel tender being coupled to the rail vehicle. The controller of the rail vehicle may be referred to herein as the locomotive controller and a controller on the fuel tender may be referred to herein as the tender controller. Further, in one example, the engine of the rail vehicle is a multi fuel engine and the fuel in the fuel container is natural gas. In alternate embodiments, the fuel may be another type of fuel stored in a fuel container and consumed at an engine of a vehicle.

The method begins at 802 by determining operating conditions of the rail vehicle and fuel tender. Operating conditions of the rail vehicle and fuel tender include a speed of the rail vehicle, engine speed and load, a ratio of CNG to alternate fuel consumed at the engine of the rail vehicle, fuel flow from the fuel tender to the engine of the rail vehicle, or the like. At 803, the method includes determining if the rail vehicle is initializing (e.g., starting). For example, if the rail vehicle is starting, or booting up, after a period of inactivity, the rail vehicle may be initializing.

If the rail vehicle is initializing, the method continues on to 804 to receive an initial fuel value measured at the fuel container on the fuel tender. For example, upon initializing, the rail vehicle may request a fuel value measurement from the fuel tender. In one example, the fuel value is a fuel level of the fuel container. In another example, the fuel value is a volume or mass of fuel in the fuel container. As discussed above, in one example, the fuel level is determined using a bubbler method. In some cases, the volume of fuel in the fuel container is determined based on the fuel level and the geometry of the fuel container. In another example, the mass of fuel in the fuel container is determined based on the fuel level, the geometry of the fuel container, and a density of the fuel.

As discussed above, in one example, the fuel tender has its own controller (e.g., tender controller 220 shown in FIGS. 1-2) that determines the fuel value. The tender controller then communicates the determined fuel value to the locomotive controller (e.g., first locomotive controller 136 shown in FIGS. 1-2). For example, the tender controller may communicate the fuel value to the locomotive controller via a network or other wired or wireless connection.

At 805, the method includes storing the initial fuel value received from the fuel tender in the locomotive controller along with a corresponding time stamp. The corresponding time stamp includes a time at which the fuel value is received and stored in the locomotive controller. Storing the fuel value and corresponding time stamp includes storing these values within a memory of the locomotive controller. In this case, the time stamp corresponds to when the rail vehicle was started or initialized. Then, when the locomotive engine begins consuming fuel, the initially stored value is modified based on fuel consumption of the locomotive engine, as discussed further below.

If the rail vehicle is not initializing at 803, the method continues on to 806 to receive a fuel value measured at the fuel container on the fuel tender. As discussed above at 804, the fuel value is one or a fuel level, a fuel volume, or a fuel mass of the fuel container. During rail vehicle operation, the locomotive controller may continually receive fuel values from the tender controller.

At 807, the method includes determining if the rail vehicle speed is less than a threshold speed and/or if the vehicle acceleration is less than a threshold acceleration for a duration. Since the fuel tender is coupled to the rail vehicle, the fuel tender speed and acceleration is substantially the same as the rail vehicle speed and acceleration. In one example, the threshold speed is a speed substantially equal to zero such that the rail vehicle and fuel tender are stationary. In another example, the threshold speed is a speed greater than zero but small enough that fuel level measurements at the fuel container are more accurate compared to when the rail vehicle is traveling at a higher speed. In yet another example, the threshold acceleration is an acceleration substantially equal to zero. The fluid in the fuel container may be substantially stationary at or below the threshold acceleration, thereby resulting in a more accurate fuel level and fuel volume measurement. In one example, the duration is a threshold duration based on an amount of time required for the rail vehicle to be below the threshold speed or threshold acceleration in order to produce a fuel level measurement with a certain percentage accuracy (e.g., 95%). For example, the threshold duration may be 20 seconds. In another example, the threshold duration may be greater or less than 20 seconds. In yet another example, the condition at 807 may include the rail vehicle speed being less than the threshold speed for a first duration and/or the rail vehicle acceleration being less than the threshold acceleration for a second duration. In this example, the second duration is different than the first duration. In one example the first duration may be longer than the second duration. In another example, the second duration may be longer than the first duration. In yet another example, as explained above, the first duration and the second duration may be substantially the same.

If the speed of the rail vehicle and/or the acceleration of the rail vehicle is less than the respective threshold speed and/or acceleration for the threshold duration, the fuel value received from the fuel tender is then stored in the locomotive controller along with a corresponding time stamp at 810. The corresponding time stamp includes a time at which the fuel value is received and stored in the locomotive controller. Storing the fuel value and corresponding time stamp includes storing these values within a memory of the locomotive controller. In this way, a fuel value received from the fuel tender may only be stored in the locomotive controller of the rail vehicle when the rail vehicle speed is less than the threshold for the duration and/or when the rail vehicle acceleration is less than the threshold acceleration for the duration. In some examples, the fuel value may only be stored in the locomotive controller when the rail vehicle is stationary.

At 814, the method includes displaying the fuel value to a rail vehicle operator. At 816, the method includes adjusting vehicle operating conditions based on the fuel value. In some embodiments, the rail vehicle operator may manually adjust vehicle operating conditions responsive to the displayed fuel value. For example, the rail vehicle operator may adjust a stopping location of the rail vehicle in order to refuel the fuel tender if the fuel value is below a threshold fuel value. In one example, at 816 the locomotive controller may adjust an engine notch setting of the rail vehicle based on the fuel value. For example, if the fuel value is below a threshold fuel value, the locomotive controller may reduce the engine notch setting to conserve fuel. In another example, the locomotive controller may send requests to adjust one or more valves in order to adjust an amount of fuel (e.g., CNG) transferred from the fuel tender to the engine of the rail vehicle. For example, an opening of one or more valves, or a fuel pump speed, may be reduced to reduce the amount of fuel transferred to the engine responsive to a fuel value below a threshold fuel value. In yet another example, refueling of the fuel tender may be adjusted based on the fuel value. For example, in response to the fuel value being below a threshold fuel value, the locomotive controller may alert a vehicle operator that refueling of the fuel tender is required. Alternatively or additionally, in response to the fuel value being below the threshold value, the locomotive controller may notify external users through a wireless network that refueling of the fuel tender is required. In other examples, the load of the rail vehicle may be shifted to another locomotive in the consist if the fuel value is below a threshold fuel value.

The method continues on from 816 to loop back to 806 where the locomotive controller receives a fuel value measured at the fuel container on the fuel tender. If the rail vehicle speed or acceleration is at or greater than the respective threshold or the rail vehicle speed or acceleration is not below the respective threshold for the duration, the locomotive controller modifies the fuel value based on fuel consumption at 809, as described further below. The locomotive controller may continuously (e.g., repeatedly) modify the fuel value while the rail vehicle speed is greater than the threshold speed and/or the rail vehicle acceleration is greater than the threshold acceleration. In one example, the locomotive controller may repeatedly modify the fuel value every 10 seconds during rail vehicle operation at or above the threshold speed and/or threshold acceleration. In another example, the locomotive may modify the fuel value after a period of less than or greater than 10 seconds. In this way the locomotive controller may modify the fuel value at a determined frequency, the modifying based on fuel consumption while the rail vehicle speed is less than the threshold speed and/or the rail vehicle acceleration is less than the threshold acceleration. As the locomotive controller continuously modifies the fuel value at the determined frequency, the updated modified fuel value may then be displayed to the vehicle operator (as described at 814). Thus, the displayed fuel value may change at a similar frequency as the modifying frequency.

However, if the rail vehicle speed is less than the threshold speed or the rail vehicle acceleration is less than the threshold acceleration for the duration, the method returns to 810 to store the most recent fuel value received from the fuel tender, along with a new corresponding time stamp. In this way, the initially stored fuel value is updated with a newly measured fuel value.

Returning to 807, if the rail vehicle speed and/or rail vehicle acceleration is not less than the threshold speed or threshold acceleration for the threshold duration, the fuel value is not stored in the locomotive controller of the rail vehicle at 808. In some examples, the locomotive controller may continuously receive fuel values from the fuel tender. However, if the rail vehicle is moving faster than the threshold speed, accelerating faster than the threshold acceleration, or moving below the threshold speed or acceleration for less than the threshold duration, the fuel values are not stored in the locomotive controller. In one example, when the rail vehicle is moving faster than the threshold speed and/or the rail vehicle is accelerating faster than the threshold acceleration, a current fuel value stored in the locomotive controller is not modified or updated based on the newly sent fuel value.

Then, at 809, the method includes modifying the last stored or modified fuel value in the locomotive controller based on fuel consumption of the rail vehicle. Modifying the stored, initial fuel value includes subtracting an amount of fuel (e.g., natural gas fuel) consumed by the engine of the rail vehicle since a time of storing the initial fuel value (e.g., based on the time stamp) from the initial fuel value. In one example, the amount of fuel consumed is based on a pre-determined fuel efficiency value of the engine of the rail vehicle. For example, the fuel efficiency value may include a miles/gallon estimate. The amount of fuel consumed may then be determined based on the fuel efficiency value, a number of miles traveled since the time stamp of the initial fuel value, and a percentage or ratio of CNG to alternate fuel consumed by the engine.

In another example, the amount of fuel consumed is based on a flow rate of fuel (e.g., CNG) flowing from the fuel tender, into the rail vehicle, and to the engine. In this example, the amount of fuel consumed is further based on a temperature and pressure of the fuel. Specifically, the flow rate, temperature, and pressure of the fuel may be used to determine a mass of fuel sent to the engine. In some examples, the mass of fuel may be converted to a volume of fuel which may then be subtracted from the initial fuel value.

In yet another example, the amount of fuel consumed is based on a total amount of energy in engine cylinders, an energy contribution of natural gas in the engine cylinders, and an energy value of natural gas. For example, a total amount of energy in the cylinders of the engine of the rail vehicle may be known. By knowing an energy density or energy value of the natural gas, along with an energy contribution of the natural gas in the engine cylinders (e.g., ratio or percentage of natural gas to alternate fuel), the locomotive controller may determine the amount of fuel (e.g., natural gas) consumed at the engine. In another example, the amount of fuel consumed is based on a locomotive efficiency estimate that is based on a mass of fuel consumed vs. energy created by an alternator of the locomotive engine.

The determined amount of fuel consumed by the engine of the rail vehicle is then subtracted from the initial fuel value to determine the modified fuel value. After modifying the fuel value at 809, the method then continues on from 809 to 814 to display the modified fuel value to the rail vehicle operator. Then, at 816 the method includes adjusting vehicle operating conditions based on the modified fuel value, as described above.

In this way, a method includes storing an initial fuel volume measurement for a fuel container of a first rail vehicle and modifying the initial fuel volume measurement based on fuel consumption of an engine of a second rail vehicle to determine a modified fuel volume. The second rail vehicle is coupled to the first rail vehicle. In one example, the initial fuel volume measurement is based on a pressure of a column of fuel in the fuel container. Additionally, in one example, the first rail vehicle is a fuel tender and the second rail vehicle is a locomotive. Further, the locomotive is in communication with the fuel tender and the fuel tender is coupled to the locomotive.

Storing the initial fuel volume measurement includes receiving the initial fuel volume measurement from the first rail vehicle and storing the initial fuel volume measurement in a controller of the second rail vehicle. In one example, the initial fuel volume measurement is stored when the second rail vehicle is stationary for a duration. In another example, the initial fuel volume measurement is stored when one or more of a speed of the second rail vehicle is less than a threshold speed for a duration or an acceleration of the second rail vehicle is less than a threshold acceleration for the duration. The method further includes receiving a fuel volume measurement from the first rail vehicle and not storing the fuel volume measurement when one or more of a speed of the second rail vehicle is greater than a threshold speed or an acceleration of the second rail vehicle is greater than a threshold acceleration.

Modifying the initial fuel volume measurement includes subtracting an amount of fuel consumed by the engine of the second rail vehicle since a time of the initial fuel volume measurement from the initial fuel volume measurement. In one example, the fuel is natural gas. In a first example, the amount of fuel consumed is based on a pre-determined fuel efficiency value of the engine of the second rail vehicle. In a second example, the amount of fuel consumed is based on a flow rate of fuel flowing into the second rail vehicle and to the engine, a temperature of the fuel, and a pressure of the fuel. In a third example, the amount of fuel consumed is based on a total amount of energy in engine cylinders, an energy contribution of natural gas in the engine cylinders, and an energy value of natural gas.

The method further includes displaying the modified fuel volume to an operator of the second rail vehicle. Additionally, the method includes adjusting one or more of an engine notch setting of the second rail vehicle, an amount of fuel transferred from the first rail vehicle to the engine of the second rail vehicle, and refueling of the second rail vehicle responsive to the modified fuel volume.

FIG. 9 shows a graphical example of storing a fuel volume received from a fuel tender and modifying the stored fuel volume based on fuel consumption of a locomotive engine. Specifically, graph 900 shows changes in speed of a rail vehicle at plot 902, changes in a stored fuel volume at plot 904, changes in a modified fuel volume at plot 906, and changes in fuel consumption of the locomotive engine at plot 908. As discussed above, a fuel tender including a fuel container may be coupled to a rail vehicle (e.g., locomotive). The rail vehicle includes a locomotive controller which receives fuel volume measurements from the fuel tender, the fuel volume measurements corresponding to the volume of fuel in the fuel container. In alternate examples, the locomotive controller may receive another type of fuel value such as a fuel level or fuel mass of the fuel container. In one example, the fuel container holds LNG and the locomotive engine consumes CNG transferred from the fuel tender to the rail vehicle. CNG fuel consumption of the locomotive engine on the rail vehicle is then used to modify the fuel volume stored in the locomotive controller. Further, graph 900 shows storing and modifying the fuel volume based on rail vehicle speed in relation to a threshold speed. However, in alternate embodiments, storing and modifying the fuel volume measurements received at the locomotive controller may be based additionally or alternatively on rail vehicle acceleration in relation to a threshold acceleration.

Prior to time t1, the rail vehicle is traveling at a speed greater than zero (plot 902). Also before time t1, an initial fuel volume is stored in the locomotive controller. At time t1, the rail vehicle speed decreases to substantially zero, thereby indicating that the rail vehicle is stationary (plot 902). Thus, in this example, the threshold speed is zero. However, in alternate examples, the threshold speed may be a speed greater than zero. After a threshold duration, d1, a fuel volume received at the locomotive controller from the fuel tender is stored within the locomotive controller (plot 904). As seen at plot 904, the stored fuel volume (or value) at time t2 is smaller than the initially stored fuel value prior to time t1.

At time t3, the rail vehicle begins moving again, as illustrated by an increase in rail vehicle speed (plot 902). As the rail vehicle tractive effort increases and the locomotive engine operates, fuel consumption of the locomotive engine increases (plot 908). As a result, after time t3, the stored fuel volume is modified based on fuel consumption to determine a modified fuel volume (plot 906). The modified fuel volume is equal to the stored fuel volume at time t3 and decreases based on fuel consumption thereafter (plot 906). During the time between time t3 and time t4, fuel volume measurements may continue to be sent from the tender controller to the locomotive controller. However, since the rail vehicle is moving at a speed above the threshold speed, the fuel volumes are not stored in the locomotive controller. Said another way, the stored fuel volume is not updated between time t3 and time t4 since the rail vehicle speed is above the threshold speed.

At time t4, the rail vehicle speed decreases below the threshold speed and is substantially zero (plot 902). Fuel consumption also decreases as the rail vehicle speed decreases and the engine stops consuming fuel (plot 908). As a result, the modified fuel volume remains relatively constant (plot 906). After the rail vehicle speed is substantially zero for the threshold duration d1, the stored fuel volume is updated at time t5. As seen at plot 904, the updated stored fuel volume is less than the previously stored fuel volume. Also, in some cases, as shown at FIG. 9, the updated stored fuel volume at time t5 is slightly different than the modified fuel volume just before time t5. Since the modified fuel volume is an estimated value, the stored fuel volume received from the fuel tender may represent a more accurate fuel volume value. As such, the updated stored fuel volume is modified after time t5, once the rail vehicle begins moving again.

As illustrated at FIG. 9, a method includes receiving a fuel volume determined at a fuel container on a fuel tender and storing the fuel volume in a controller of a rail vehicle when the rail vehicle is stationary for a duration (as shown at time t2), the rail vehicle coupled to the fuel tender. As shown between time t3 and time t4, the method further includes repeatedly modifying the fuel volume based on fuel consumption of an engine of the rail vehicle to determine a modified fuel volume. The method may then include displaying the modified fuel volume to a rail vehicle operator. In one example, repeatedly modifying the fuel volume includes continuously modifying the fuel volume while the rail vehicle is moving. As shown at time t5, the method further includes subsequently updating the fuel volume stored in the controller when the vehicle is again stationary for the duration.

In this way, a fuel volume of a fuel container may be modified based on fuel consumption of an engine of a rail vehicle. As discussed above, liquid natural gas (LNG) may be stored in a fuel container on a fuel tender, the fuel tender coupled to the rail vehicle. In one example, the rail vehicle is a locomotive with a locomotive engine and locomotive controller. The LNG may then be converted to gaseous natural gas (CNG) and transferred to the rail vehicle to be consumed at the locomotive engine. A tender controller may continuously send fuel volume measurements to the locomotive controller. However, the fuel volume measurements may only be stored in the locomotive controller when the rail vehicle is stationary for a duration or the acceleration of the rail vehicle is below a threshold acceleration. When the rail vehicle is moving or accelerating above the threshold acceleration, the stored fuel volume measurement may then be modified based on CNG fuel consumption of the locomotive engine to determine a modified fuel volume. In one example, engine and/or vehicle operating conditions may be adjusted based on the modified fuel volume. In this way, an estimation of the fuel volume in the fuel container may be determined while the rail vehicle is moving. Further, the fuel volume estimate (e.g., modified fuel volume) may be more accurate than the fuel volume measurement sent from the fuel tender while the rail vehicle is moving. As a result, fuel tender fueling and locomotive engine operation may be optimized based on the modified fuel volume.

As one embodiment, a control system for a vehicle system comprises a controller operable to: determine a required pressure relief event is needed for a fuel tank on a fuel tender coupled to a first vehicle; and one or more of communicate a request to reduce a pressure of a gaseous component disposed within the fuel tank or adjust operation of a first engine on board the first vehicle to consume the gaseous component. The controller is further operable to estimate a duration until the required pressure relief event and determine the required pressure relief event is needed based on one or more of the duration being less than a threshold duration or a pressure of the gaseous component being greater than a threshold pressure. The controller is further operable to communicate one of the request to reduce the pressure of the gaseous component or adjust operation of the first engine to consume the gaseous component responsive to one or more of the duration until the required pressure relief event being less than the threshold duration or the pressure of the gaseous component being greater than the threshold pressure. Additionally, the controller is further operable to, if the duration until the required pressure relief event is greater than the threshold duration or if the pressure of the gaseous component is less than the threshold pressure, fluidly de-couple the first vehicle from the fuel tender. In one example, the duration until the required pressure relief event is based on a time until a vapor space pressure of the fuel tank reaches a threshold level for venting the gaseous component from the fuel tank to atmosphere, where the vapor space pressure is based on a temperature and volume of liquid fuel in the fuel tank. In another example, the fuel tank is a liquid fuel tank containing liquid fuel and the gaseous component is gaseous fuel. The request to reduce the pressure of gaseous component may be sent from the controller to the fuel tender and may include a request to stop vaporizing liquid fuel to gaseous fuel and send remaining gaseous fuel to the first engine when a supply pressure of the gaseous fuel is greater than a threshold supply pressure.

In one example, the controller is further operable to adjust one or more valves to allow gaseous fuel to bypass a gaseous fuel supply regulator valve and flow to the first engine on board the first vehicle when a supply pressure of gaseous fuel from the fuel tender is less than a threshold supply pressure and in response to determining the required pressure relief event is needed. The controller may be further operable to adjust pressure settings of the gaseous fuel supply regulator valve to allow passage of the gaseous fuel from the fuel tender to the first engine when a supply pressure of the gaseous fuel is less than a threshold supply pressure and in response to determining the required pressure relief event is needed. In another example, the controller is further operable to decrease a substitution ratio of gaseous fuel to primary fuel at the first engine on board the first vehicle below a demanded ratio when a supply pressure of gaseous fuel from the fuel tender is less than a threshold supply pressure and in response to determining the required pressure relief event is needed. In yet another example, the first vehicle and the fuel tender are part of a consist, the consist further including a second vehicle and the controller is further operable to decrease a first notch setting of the first engine on board the first vehicle in order to reduce an intake manifold pressure below a supply pressure of the gaseous fuel and increase a second notch setting of a second engine on board the second vehicle to compensate for the decreased first notch setting and produce a demanded torque output for the consist when a supply pressure of gaseous fuel from the fuel tender is less than a threshold supply pressure and in response to determining the required pressure relief event is needed. The required pressure relief event includes opening of a pressure relief valve of the liquid fuel tank to vent boil-off gases from the liquid fuel tank to atmosphere. Additionally, the controller may be coupled to an automatic engine start stop (AESS) device configured to restart the first engine to consume the gaseous component in response a vapor space pressure of the fuel tank increases above a threshold level.

As another embodiment, a vehicle system comprises a controller configured to be disposed on a first vehicle and that is operable to: during a first condition, if a supply pressure of gaseous fuel in a gaseous fuel system is above a threshold pressure, send a fuel request to a fuel tender coupled to the first vehicle to stop vaporizing liquid fuel to gaseous fuel and consume a remaining amount of gaseous fuel at a first engine of the first vehicle; and if the supply pressure of gaseous fuel is below the threshold pressure, adjust one or more vehicle operating parameters of the first vehicle to allow consumption of the gaseous fuel at the first engine. The controller may be further operable to decrease a first notch setting (e.g., first throttle setting) of the first engine to reduce an intake manifold pressure below the supply pressure of gaseous fuel when the supply pressure of gaseous fuel is below the threshold pressure. In one example, the vehicle system is a consist comprising the first vehicle, the fuel tender, and a second vehicle all coupled to one another and the controller is further operable to increase a second notch setting (e.g., second throttle setting) of a second engine of the second vehicle to compensate for the decreased first throttle setting of the first engine. The vehicle system may further comprise one or more gaseous fuel supply valves disposed in gaseous fuel supply lines of the first vehicle and configured to control a flow of gaseous fuel to the first engine. In this way, the one or more vehicle operating parameters of the first vehicle include a gaseous fuel to diesel fuel substitution ratio used at the first engine or a position of the one or more gaseous fuel supply valves. Further, when the supply pressure of gaseous fuel is below the threshold pressure the controller is further operable to adjust the one or more gaseous fuel supply valves to allow gaseous fuel below the threshold pressure to bypass a regulator valve configured to only allow gaseous fuel above the threshold pressure to flow to the first engine. Additionally, the first condition includes one or more of when a duration until a liquid fuel tank on the fuel tender vents gas to atmosphere is less than a threshold duration, when a vapor space pressure of the liquid fuel tank is over a threshold pressure, or when a request to fluidly de-couple the fuel tender from the first vehicle is received at the controller.

As yet another embodiment, a vehicle system comprises a controller configured to be disposed on a vehicle and that is operable to: in response to a vapor space pressure of a liquid fuel tank on board a fuel tender coupled to the vehicle being greater than a threshold pressure, send a request to the fuel tender to stop vaporizing liquid fuel to gaseous fuel and combine liquid fuel vapors from a liquid fuel tank with already vaporized gaseous fuel and deliver the combined liquid fuel vapors and vaporized gaseous fuel to an engine of the vehicle. The controller may be further operable to determine the vapor space pressure based on one of an output of a pressure sensor disposed in the liquid fuel tank or a temperature and volume of liquid fuel in the liquid fuel tank. The controller may be further operable to send the request to the fuel tender in response to receiving a request to enter a fuel storage mode where the fuel tender is fluidly de-coupled from the vehicle. Further still, the controller may be operable to adjust operation of the engine to consume the combined liquid fuel vapors and vaporized gaseous fuel in response to one or more of the request to enter the fuel storage mode or the vapor space pressure over the threshold pressure.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A control system for a vehicle system, comprising: a controller configured to: determine a pressure relief event is needed for a fuel tank on a fuel tender coupled to a first vehicle; and perform one or more of reducing a pressure of a gaseous component disposed within the fuel tank or adjusting operation of a first engine on board the first vehicle to consume the gaseous component, where the fuel tank is a liquid fuel tank containing liquid fuel and the gaseous component is gaseous fuel, and where the reducing of the pressure of the gaseous component includes stopping vaporizing liquid fuel to gaseous fuel and sending remaining gaseous fuel to the first engine when a supply pressure of the gaseous fuel is greater than a threshold supply pressure.

2. The control system of claim 1, wherein the controller is further configured to estimate a duration until the required pressure relief event and determine the required pressure relief event is needed based on one or more of the duration being less than a threshold duration or the pressure of the gaseous component being greater than a threshold pressure, and wherein the controller is further configured to reduce the pressure of the gaseous component or adjust operation of the first engine to consume the gaseous component responsive to one or more of the duration until the required pressure relief event being less than the threshold duration or the pressure of the gaseous component being greater than the threshold pressure.

3. The control system of claim 2, wherein the controller is further configured to, if the duration until the required pressure relief event is greater than the threshold duration or if the pressure of the gaseous component is less than the threshold pressure, fluidly de-couple the first vehicle from the fuel tender.

4. The control system of claim 2, wherein the duration until the required pressure relief event is based on a time until a vapor space pressure of the fuel tank reaches a threshold level for venting the gaseous component from the fuel tank to atmosphere, where the vapor space pressure is based on a temperature of liquid fuel in the fuel tank.

5. The control system of claim 1, wherein the required pressure relief event includes opening of a pressure relief valve of the fuel tank to vent at least part of the gaseous component, comprising boil-off gases, from the fuel tank to atmosphere.

6. The control system of claim 1, wherein the controller is further configured to adjust operation of the first engine to consume the remaining gaseous fuel at the first engine.

7. A control system for a vehicle system, comprising: a controller configured to: determine a pressure relief event is needed for a fuel tank on a fuel tender coupled to a first vehicle; perform one or more of reducing a pressure of a gaseous component disposed within the fuel tank or adjusting operation of a first engine on board the first vehicle to consume the gaseous component; and adjust one or more valves to allow gaseous fuel to bypass a gaseous fuel supply regulator valve and flow to the first engine on board the first vehicle when a supply pressure of gaseous fuel from the fuel tender is less than a threshold supply pressure and in response to determining the required pressure relief event is needed.

8. The control system of claim 7, wherein the controller is further configured to adjust pressure settings of the gaseous fuel supply regulator valve to allow passage of the gaseous fuel from the fuel tender to the first engine when the supply pressure of the gaseous fuel is less than the threshold supply pressure and in response to determining the required pressure relief event is needed.

9. A control system for a vehicle system, comprising: a controller configured to: determine a pressure relief event is needed for a fuel tank on a fuel tender coupled to a first vehicle; perform one or more of reducing a pressure of a gaseous component disposed within the fuel tank or adjusting operation of a first engine on board the first vehicle to consume the gaseous component; and decrease a substitution ratio of gaseous fuel to primary fuel at the first engine on board the first vehicle below a demanded ratio when a supply pressure of gaseous fuel from the fuel tender is less than a threshold supply pressure and in response to determining the required pressure relief event is needed.

10. A control system for a vehicle system, comprising: a controller configured to: determine a pressure relief event is needed for a fuel tank on a fuel tender coupled to a first vehicle; perform one or more of reducing a pressure of a gaseous component disposed within the fuel tank or adjusting operation of a first engine on board the first vehicle to consume the gaseous component, where the first vehicle and the fuel tender are part of a consist, the consist further including a second vehicle; and decrease a first throttle setting of the first engine on board the first vehicle in order to reduce an intake manifold pressure below a supply pressure of gaseous fuel and increase a second throttle setting of a second engine on board the second vehicle to compensate for the decreased first throttle setting and produce a demanded torque output for the consist when the supply pressure of the gaseous fuel from the fuel tender is less than a threshold supply pressure and in response to determining the required pressure relief event is needed.

11. A control system for a vehicle system, comprising: a controller configured to: determine a pressure relief event is needed for a fuel tank on a fuel tender coupled to a first vehicle; and perform one or more of reducing a pressure of a gaseous component disposed within the fuel tank or adjusting operation of a first engine on board the first vehicle to consume the gaseous component, where the controller is coupled to an automatic engine start stop (AESS) device configured to restart the first engine to consume the gaseous component in response a vapor space pressure of the fuel tank increasing above a threshold level.

* * * * *